(12) United States Patent
Kaushik

(10) Patent No.: US 8,555,409 B2
(45) Date of Patent: Oct. 8, 2013

(54) SYSTEM AND METHOD FOR PROVIDING PRIVATE SESSION-BASED ACCESS TO A REDIRECTED USB DEVICE OR LOCAL DEVICE

(75) Inventor: Puneet Kaushik, Ghaziabad (IN)

(73) Assignee: Wyse Technolgoy Inc., San Jose, CA (US)

( * ) Notice: Subject to any disclaimer, the term of this patent is extended or adjusted under 35 U.S.C. 154(b) by 50 days.

(21) Appl. No.: 13/287,982

(22) Filed: Nov. 2, 2011

(65) Prior Publication Data

US 2013/0111561 A1 May 2, 2013

(51) Int. Cl.
 *H04L 29/06* (2006.01)
(52) U.S. Cl.
 USPC ................................ 726/29; 726/4
(58) Field of Classification Search
 USPC ........................................ 726/4, 29
 See application file for complete search history.

(56) References Cited

U.S. PATENT DOCUMENTS

| | | | |
|---|---|---|---|
| 2005/0132365 A1* | 6/2005 | Madukkarumukumana et al. | 718/1 |
| 2005/0209842 A1* | 9/2005 | Klein | 703/25 |
| 2006/0070090 A1* | 3/2006 | Gulkis | 719/328 |
| 2006/0075105 A1 | 4/2006 | Momtchilov et al. | |
| 2006/0245403 A1* | 11/2006 | Kumar | 370/338 |
| 2006/0248282 A1* | 11/2006 | Rostampour et al. | 711/141 |
| 2007/0011446 A1* | 1/2007 | Kato et al. | 713/150 |
| 2007/0061477 A1* | 3/2007 | Stoyanov et al. | 709/230 |
| 2007/0134070 A1* | 6/2007 | Smith et al. | 406/109 |
| 2007/0233869 A1 | 10/2007 | Jodh et al. | |
| 2008/0147909 A1* | 6/2008 | Zhang et al. | 710/24 |
| 2008/0288661 A1* | 11/2008 | Galles | 710/3 |
| 2009/0150550 A1 | 6/2009 | Barreto et al. | |
| 2009/0150909 A1 | 6/2009 | Barreto et al. | |
| 2010/0241772 A1* | 9/2010 | Kugimoto et al. | 710/63 |
| 2011/0047542 A1* | 2/2011 | Dang et al. | 718/1 |
| 2011/0093917 A1* | 4/2011 | Alcorn et al. | 726/1 |
| 2011/0138013 A1* | 6/2011 | Zhong et al. | 709/217 |
| 2011/0276806 A1* | 11/2011 | Casper et al. | 713/189 |
| 2012/0254123 A1* | 10/2012 | Ferguson et al. | 707/649 |

OTHER PUBLICATIONS

International Search Report and Written Opinion; PCT/US2012/032984; pp. 11, Feb. 14, 2013.

* cited by examiner

*Primary Examiner* — Michael Pyzocha
(74) *Attorney, Agent, or Firm* — Baker Botts L.L.P.

(57) ABSTRACT

Restricting access to a device from a server, where the device is remote to the server and is connected locally to a client that is remote to the server, is described. The operations may include facilitating interception, at the server, of a function call to create a symbolic link; facilitating determination that the intercepted function call to create the symbolic link corresponds to a device object associated with the device that is remote to the server and is connected locally to a client that is remote to the server; facilitating obtaining configuration data indicating whether access to the device is to be restricted; and facilitating creation of the symbolic link in a local namespace of an object manager namespace of the server, upon obtaining configuration data indicating that access to the device is to be restricted.

33 Claims, 15 Drawing Sheets

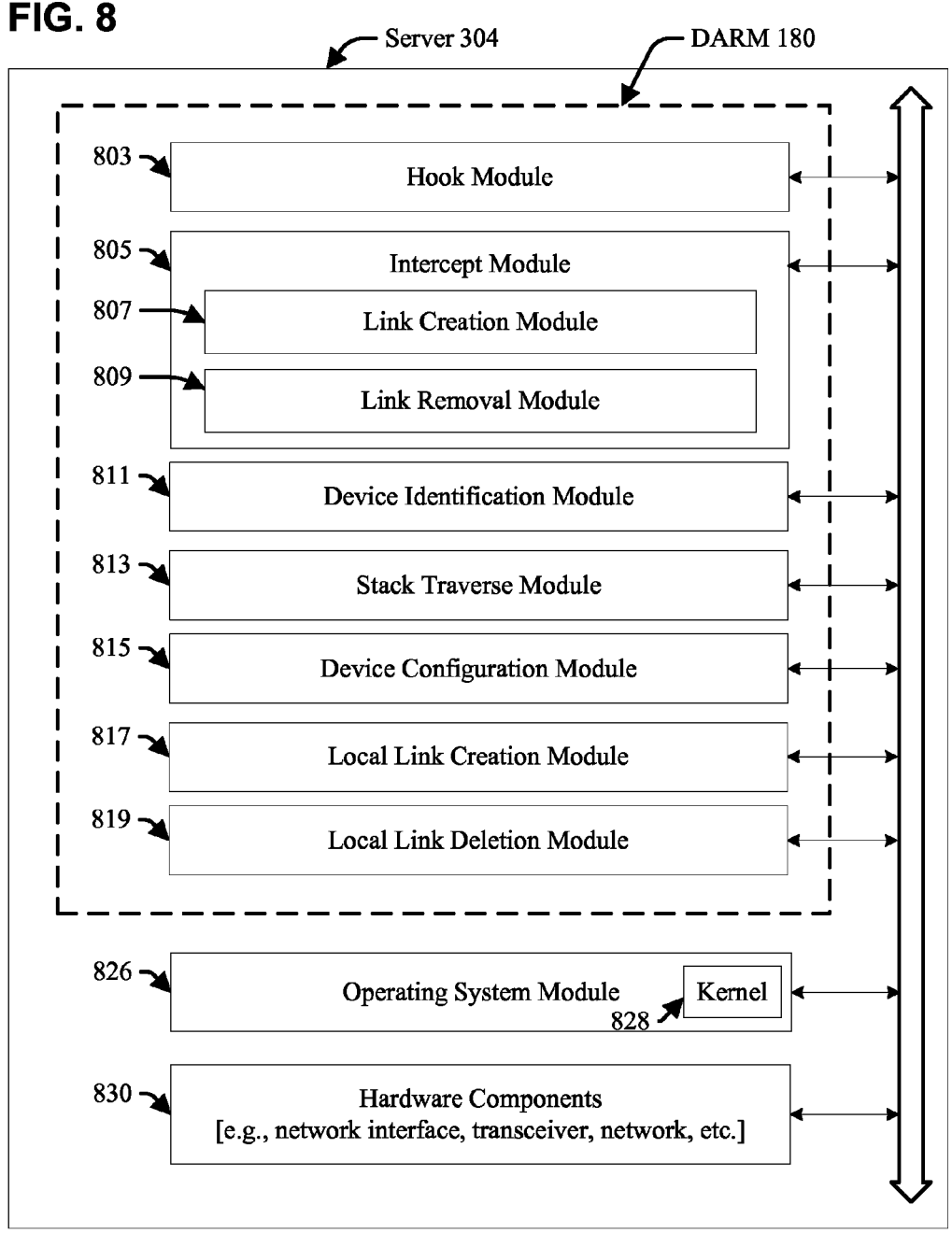

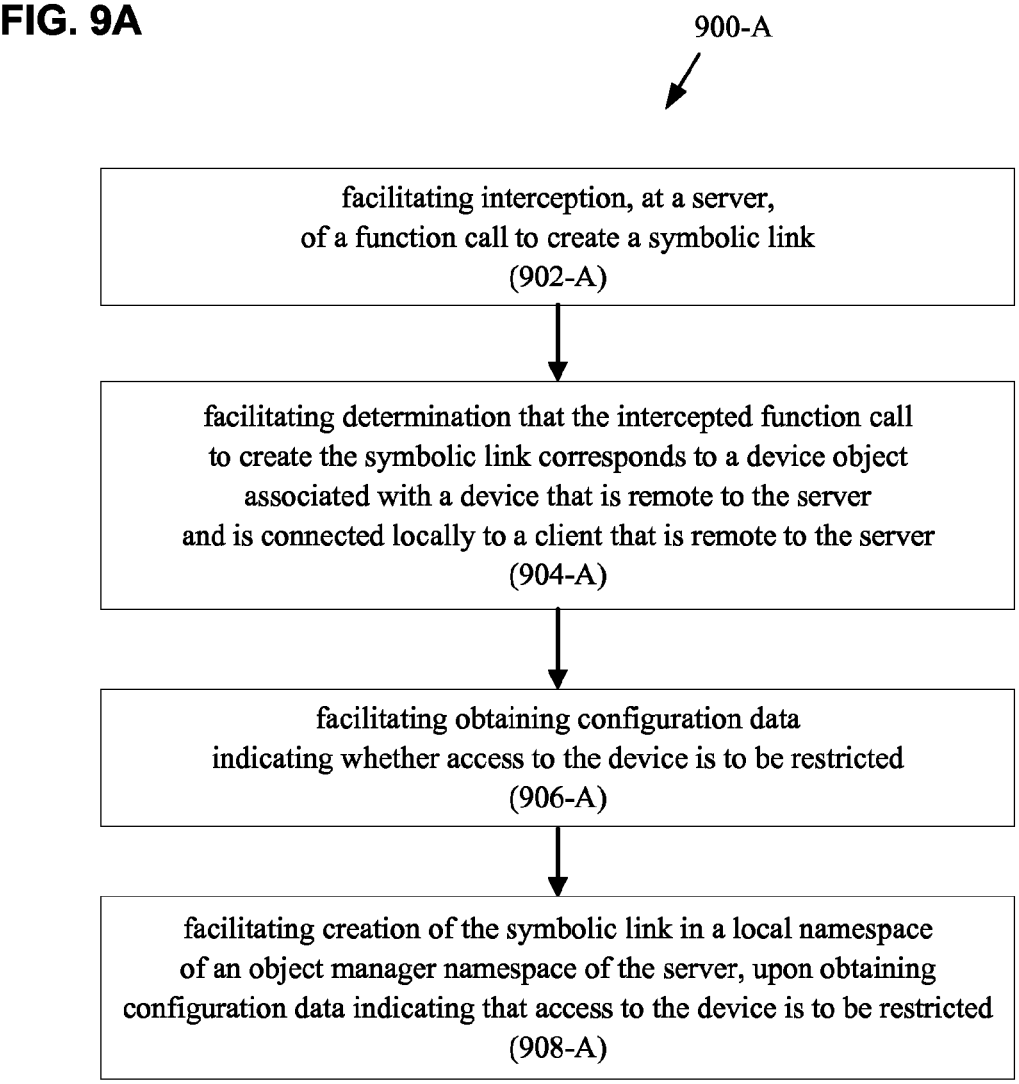

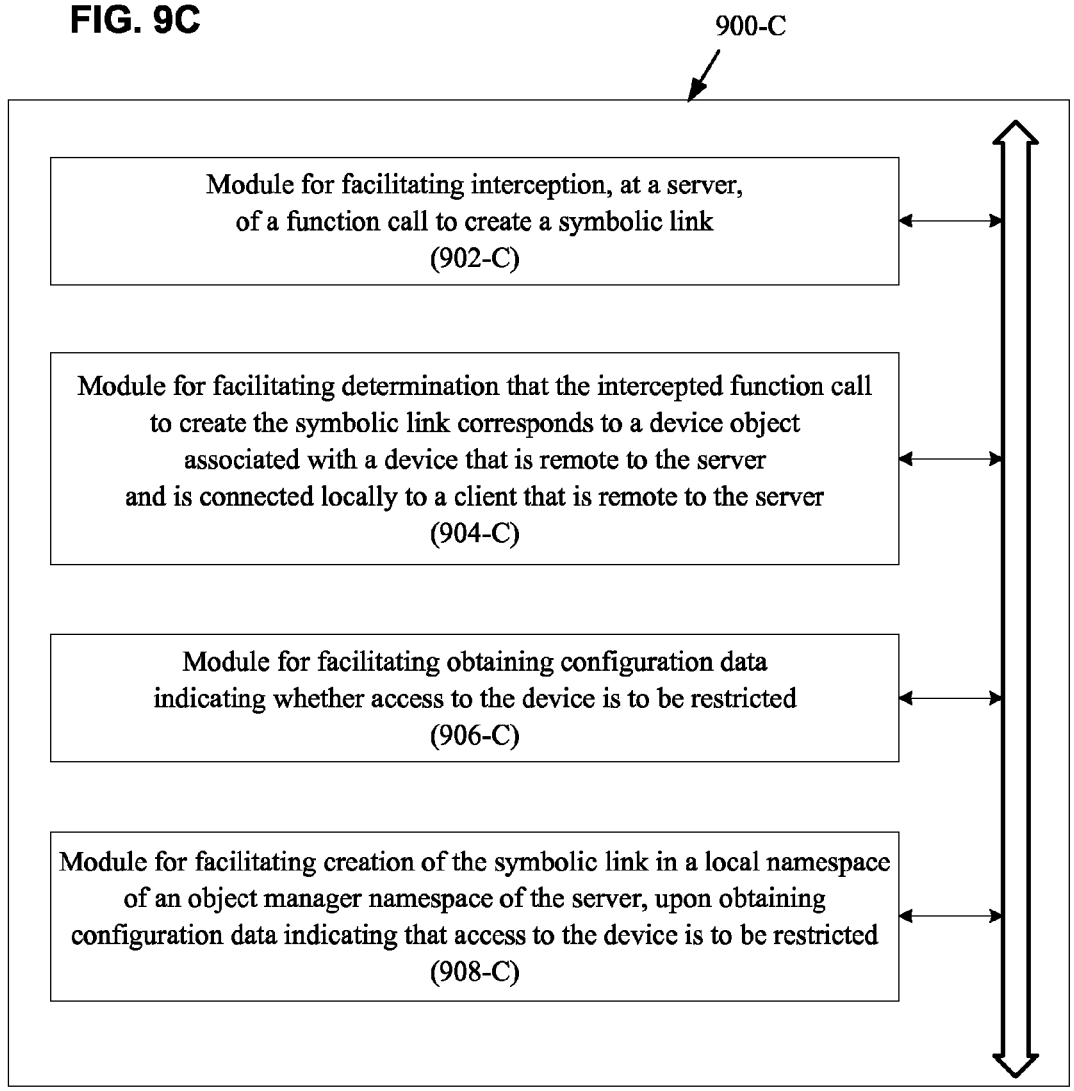

SYSTEM AND METHOD FOR PROVIDING PRIVATE SESSION-BASED ACCESS TO A REDIRECTED USB DEVICE OR LOCAL DEVICE

FIELD

The subject technology relates in general to remote computing, and more particularly to providing private session-based access to a redirected USB device or local device.

BACKGROUND

One approach to the design and implementation of computer networks, particularly with regard to the development of client/server applications, includes designing client applications and client terminals so that the majority of the heavily used resources are at a remote computing machine, such as a centralized server, connected via network. The client terminals generally have minimal memory, disk storage, and processor power, but are designed under the premise that most users connected to a powerful server do not need the additional processing power. With these client terminals, the total cost of ownership is minimized, because of the reduced resources and because the clients can be centrally administered and updated from the server. As such, these client terminals are suited for a network which can handle a significant number of terminals. If the client terminals have devices attached to them, then when the client terminals are connected to the server, not only the client terminals but also the client terminals' devices can become available to the server.

SUMMARY

In one aspect of the disclosure, a method for restricting access to a device from a server may comprise: facilitating interception, at the server, of a function call to create a symbolic link; facilitating determination that the intercepted function call to create the symbolic link corresponds to a device object associated with the device that is remote to the server and is connected locally to a client that is remote to the server; facilitating obtaining configuration data indicating whether access to the device is to be restricted; and facilitating creation of the symbolic link in a local namespace of an object manager namespace of the server, upon obtaining configuration data indicating that access to the device is to be restricted.

In one aspect of the disclosure, a machine-readable storage medium may be encoded with instructions executable by one or more processors to perform one or more operations. The one or more operations may comprise: facilitating interception, at a server, of a function call to create a symbolic link; facilitating determination that the intercepted function call to create the symbolic link corresponds to a device object associated with a device that is remote to the server and is connected locally to a client that is remote to the server; facilitating obtaining configuration data indicating whether access to the device is to be restricted; and facilitating creation of the symbolic link in a local namespace of an object manager namespace of the server, upon obtaining configuration data indicating that access to the device is to be restricted.

In one aspect of the disclosure, a hardware apparatus may comprise one or more modules configured to perform one or more operations comprising: facilitating interception, at a server, of a function call to create a symbolic link; facilitating determination that the intercepted function call to create the symbolic link corresponds to a device object associated with a device that is remote to the server and is connected locally to a client that is remote to the server; facilitating obtaining configuration data indicating whether access to the device is to be restricted; and facilitating creation of the symbolic link in a local namespace of an object manager namespace of the server, upon obtaining configuration data indicating that access to the device is to be restricted.

In one aspect of the disclosure, an apparatus may comprise: means for facilitating interception, at a server, of a function call to create a symbolic link; means for facilitating determination that the intercepted function call to create the symbolic link corresponds to a device object associated with a device that is remote to the server and is connected locally to a client that is remote to the server; means for facilitating obtaining configuration data indicating whether access to the device is to be restricted; and means for facilitating creation of the symbolic link in a local namespace of an object manager namespace of the server, upon obtaining configuration data indicating that access to the device is to be restricted.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

FIG. 7 is a conceptual block diagram of an example of a system that can be used as a client or as a server in the.

FIG. 8 is a simplified block diagram of examples of modules of a server of a local device virtualization system.

FIG. 9A is a block diagram representing an example of a method for restricting access to a device from a server, in accordance with one aspect of the disclosure.

FIG. 9C is a block diagram representing an example of an apparatus for restricting access to a device from a server, in accordance with one aspect of the disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Frequently, devices connected to client terminals ("client-side devices") are virtualized on a server to provide access to the devices from user sessions on the server. The virtualized devices (or redirected devices), however, are accessible from a large number of user sessions and/or client terminals. For example, in an office environment, multiple user sessions and/or clients may be connected to a server on which the device is virtualized (or redirected), and all of the multiple user sessions and/or clients connected to the server may have access to the device. A user's virtualized device connected to the user's client terminal may thus be subject to unwanted or unauthorized access or use by other users' sessions, and/or from other users' clients. A need therefore exists for systems and methods that allow access to virtualized devices to be restricted, such that secure and private access to such devices can be provided from selected user sessions while access from other user sessions can be blocked.

Figure 1:
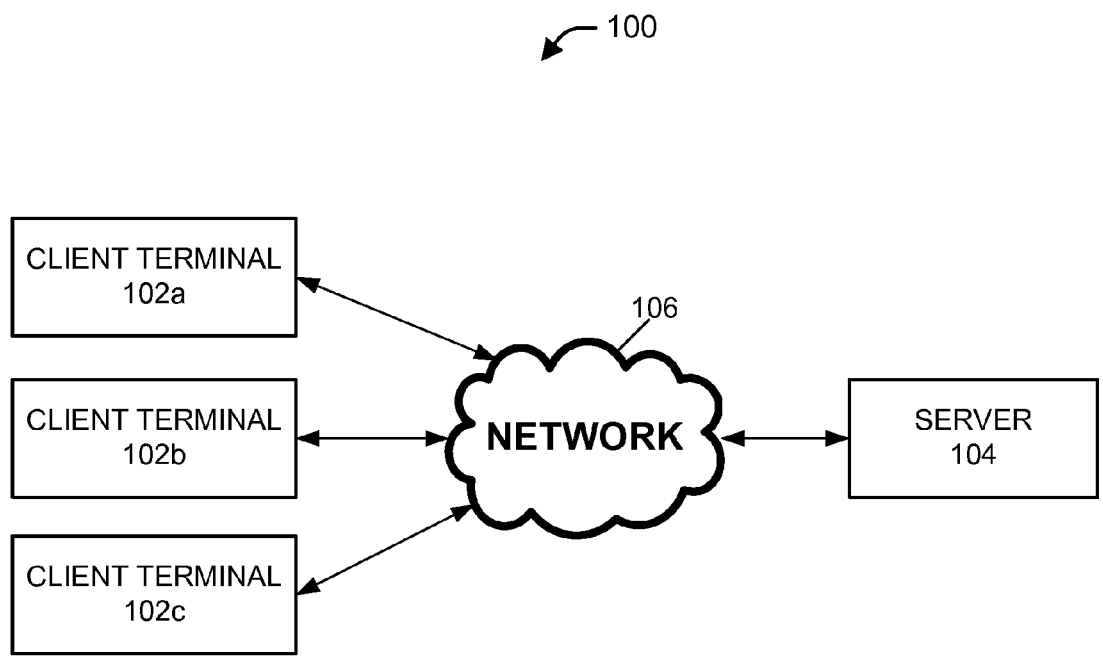
FIG. 1 is a conceptual block diagram of an example of a computer network.

FIG. 1 illustrates a simplified diagram of a system 100 in accordance with an aspect of the present disclosure. The system 100 may include one or more client terminals 102a, 102b, 102c (referenced generally herein as client(s) 102) in communication with a server 104 via a network 106. In one aspect, the server 104 is configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

In one aspect, the client terminal 102 may represent a computer, a mobile phone (e.g., smart phone), a laptop computer, a thin client terminal, a personal digital assistant (PDA), a portable computing terminal, or a suitable terminal or device with a processor. In one aspect, a server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

In one aspect, the client 102 may initiate a remote session with the server 104 by sending a request for remote access and credentials (e.g., login name and password) to the server 104. If the server 104 accepts the credentials from the client 102, then the server 104 may establish a remote session, which allows a user at the client 102 to access applications and data at the server 104. During the remote session, the server 104 sends display data to the client 102 over the network 106, which may include display data of a desktop and/or one or more applications running on the server 104. The desktop may include, for example, icons corresponding to different applications that can be launched on the server 104. The display data allows the client 102 to locally display the desktop and/or application running on the server 104.

During the remote session, the client 102 may send user commands (e.g., inputted via a mouse or keyboard at the client 102) to the server 104 over the network 106. The server 104 may process the user commands from the client 102 similar to user commands received from an input device that is local to the server 104. For example, if the user commands include mouse movements, then the server 104 may move a pointer on the desktop running on the server 104 accordingly. When the display data of the desktop and/or application changes in response to the user commands, the server 104 sends the updated display data to the client 102. The client 102 locally displays the updated display data so that the user at the client 102 can view changes at the server 104 in response to the user commands. Together, these aspects allow the user at the client 102 to locally view and input commands to the desktop and/or application that is running remotely on the server 104. From the perspective of the client side, the desktop running on the server 104 may represent a virtual desktop environment.

Figure 2A:
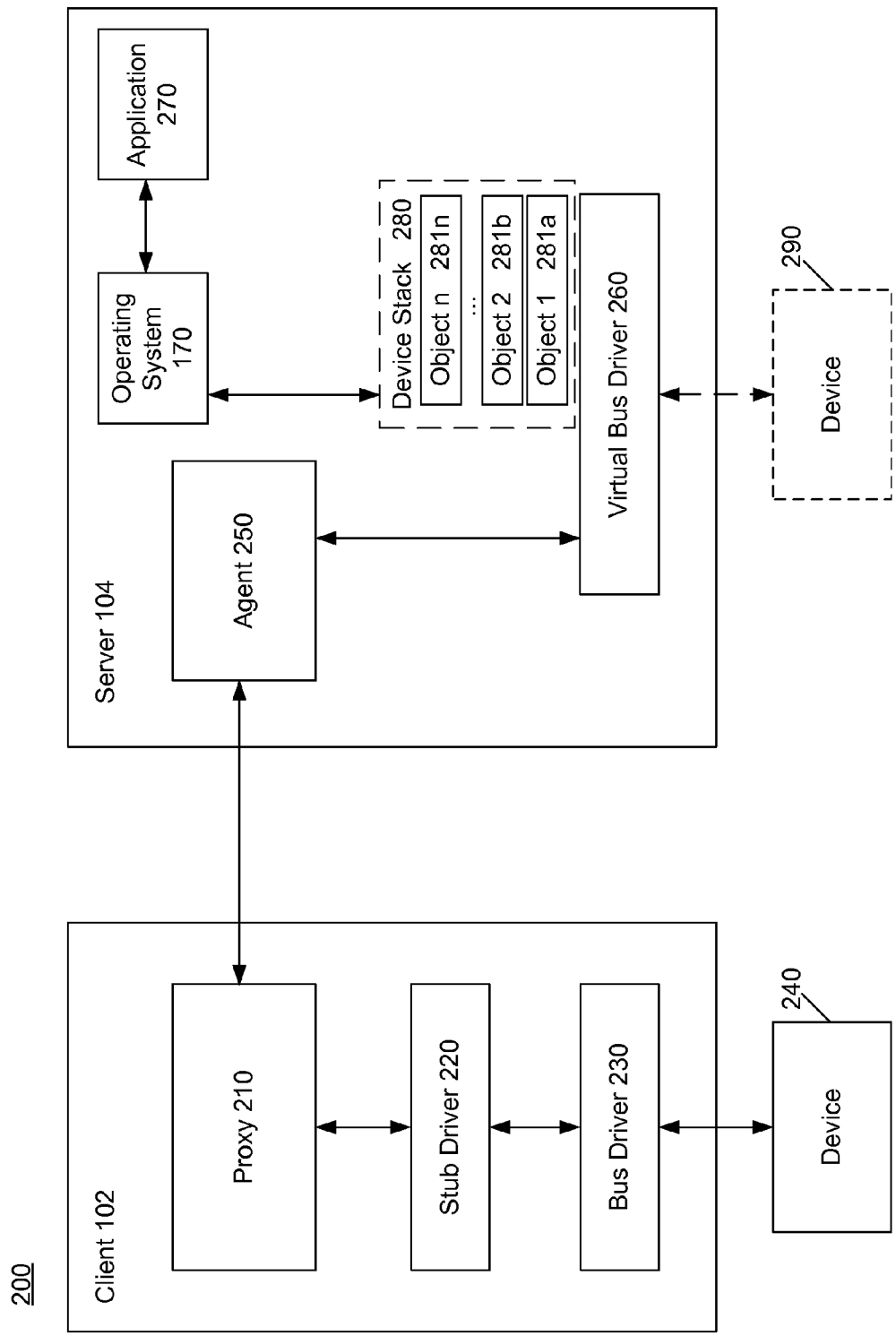
FIG. 2A is a conceptual block diagram of an example of a local device virtualization system.

FIG. 2A is a block diagram of a local device virtualization system 200 according to an aspect of the disclosure. The system 200 may include the client 102 in communication with the server 104 over the network 106 (illustrated in FIG. 1). The client 102 may include a proxy 210, a stub driver 220, and a bus driver 230. The client 102 can be connected to a device 240, as shown in FIG. 2A. The server 104 may include an agent 250, and a virtual bus driver 260.

According to the illustrated configuration, while the device 240 is not locally or physically connected to the server 104 and is remote to the server 104, the device 240 appears to the server 104 as if it is locally connected to the server 104, as discussed further below. Thus, the device 240 appears to the server 104 as a virtual device 290.

By way of illustration and not limitation, the device 240 may be a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to the client 102. The device 240 may be an external device (i.e., external to the client 102) or an internal device (i.e., internal to the client 102).

In one aspect of the disclosure, the device 240 is a Universal Serial Bus (USB) device that can be locally connected to the client 102 using a wired USB or wireless USB connection and communicates with the client 102 according to a USB communications protocol. In another aspect, the device 240 may be a device other than a USB device.

As used herein, a "local" device of a system, or a device "locally" connected to a system, may be a device directly connected to the system using one or more wires or connectors (e.g., physically connected to the system), or a device directly connected to the system using a wireless link (e.g., Bluetooth). For example, device 240 is a local device of client 102. Furthermore, in one aspect of the disclosure, a local device of a system or a device locally connected to a system may include a device within the system (e.g., an internal device of client 102).

A "remote" device, or a device "remote" to a system, may be a device that is not directly connected to the system. For example, the server 104 is remote to both client 102 and device 240 because server 104 is not directly connected to client 102 or device 240 but connected indirectly through network 106 (illustrated in FIG. 1), which can include, for example, another server, or the Internet.

The bus driver 230 can be configured to allow the operating system and programs of the client 102 to interact with the device 240. In one aspect, when the device 240 is connected to the client 102 (e.g., plugged into a port of the client 102), the bus driver 230 may detect the presence of the device 240 and read information regarding the device 240 ("device information") from the device 240. The device information may include features, characteristics and other information specific to the device. For an example of a USB device, the device information may comprise a device descriptor (e.g., product ID, vendor ID and/or other information), a configuration descriptor, an interface descriptor, an endpoint descriptor and/or a string descriptor. The bus driver 230 may communicate with the device 240 through a computer bus or other wired or wireless communications interface.

In one aspect, a program (e.g., application) running locally on the client 102 may access the device 240. For example, the device 240 may be accessed locally when the client 102 is not connected to the server 104. In this aspect, the operating system (e.g., Microsoft Windows®) of the client 102 may use the device information to find and load an appropriate device driver (not shown) for the device 240. The device driver may provide the program with a high-level interface to the device 240.

In one aspect, the device 240 may be accessed from the server 104 as if the device were connected locally to the server 240. The device 240 may be accessed from the server 104 when the client 102 is connected to the server 104 through a user session running on the server 104. For example, the device 240 may be accessible from the desktop running on the server 104 (i.e., virtual desktop environment). In this aspect, the bus driver 230 may be configured to load the stub driver 220 as the default driver for the device 240. The stub driver 220 may be configured to report the presence of the device 240 to the proxy 210 and to provide the device information (e.g., device descriptor) to the proxy 210.

The proxy 210 may be configured to report the presence of the device 240, along with the device information, to the agent 250 of the server 104 over the network 106 (illustrated in FIG. 1). Thus, the stub driver 220 redirects the device 240 to the server 104 via the proxy 210.

The agent 250 may be configured to receive the report from the proxy 210 that the device 240 is connected to the client 102 and the device information. The agent 250 may further be configured to associate with the report from the proxy 210 one or more identifiers for the client 102 and/or for a user session through which the client 102 is connected to the server 104, such as a session number or a session local unit identifier (LUID). The agent 250 can provide notification of the device 240, along with the device information, to the virtual bus driver 260. The virtual bus driver 260 (which may be a TCX USB bus driver, or any other bus driver) may be configured to create and store in memory a record corresponding to the device 240, the record including at least part of the device information and session identifiers received from agent 250. The virtual bus driver 260 may be configured to report to the operating system 170 (or to a kernel of the operating system 170) of the server 104 that the device 240 is connected and to provide the device information to the operating system. This allows the operating system of the server 104 to recognize the presence of the device 240 even though the device 240 is connected to the client 102.

The operating system of the server 104 may use the device information to find and load one or more appropriate device drivers for the device 240 at the server 104. Each driver may have an associated device object (object(s) 281*a*, 281*b*, . . . , 281*n*, referred to generally as device object(s) 281), as illustratively shown in FIG. 2A. A device object 281 is a software implementation of a real device 240 or a virtualized (or conceptual) device 290. Different device objects 281 layer over each other to provide the complete functionality. In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for the device 240. For example, for a USB device, a USB bus driver will create a device object 281*a* stating that a new device has been plugged in. Next a plug-and-play (PNP) component of the operating system kernel (e.g., Windows kernel) will search for and load the best driver for the device 240, which will create another device object 281*b* that is layered over the previous device object 281*a*. The layering of device objects 281 will create the device stack 280.

The device objects 281 may be stored in a memory of the server 104 associated with the bus driver 260. In particular, the device objects and resulting device stack 280 may be stored in random-access memory of the server 304. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headset, or USB pen drive. A USB pen drive, for example, can create an USB device stack first, over which it can create a storage device stack, where each of the device stacks have two or more device objects.

Once one or more device object(s) 281 are loaded by the operating system of the server 104, each device object 281 can create a symbolic link (also referred to as a "device interface") to the device object and associated driver. The symbolic link is used by applications running on the server 104 to access the device object 281 and the device 240/290. The symbolic link can be created by a call to a function such as IOCreateSymbolicLink( ) including such arguments as a name for the symbolic link, and a name of the device object 281 or associated device 240. In one example, for example, a symbolic link to a USB flash drive device 240 is created by a call from a device object 281 for the device 240 to the function IOCreateSymbolicLink( ) including arguments "\\GLOBAL??\C:" (i.e., the name for the symbolic link) and "\Device\HarddiskVolume1" (i.e., a name of the device object).

A device interface is similar to a symbolic link, and the terms are used interchangeably herein. In Windows-based operating systems, a device interface may be a symbolic link for which the name is chosen by Windows based on device type. The creation or registration of a device interface can use the same application program interfaces (APIs) as those used in the creation of symbolic links.

The creation of a symbolic link results in an entry being created in an object manager namespace (OMN) (described in more detail in relation to FIG. 4A below) of the operating system 170. The OMN stores information on symbolic links created for and used by the operating system 170, including symbolic links for devices 240, virtualized devices 290, and applications 270 running on the server 104.

As a result of the symbolic link creation process, a symbolic link to the device 240 is enumerated in the OMN of the server 104. Once the presence of the device 240 is reported to the operating system 170 of the server 104, the device 240 may be accessible from a user session (and associated desktop) running on the server 104 (i.e., virtual desktop environment). For example, the device 240 may appear as an icon on the virtual desktop environment and/or may be accessed by applications running on the server 104.

In one aspect, an application 270 running on the server 104 may access the device 240 by sending a transaction request including the symbolic link for the device 240 to the operating system 170. The operating system 170 may consult the Object Manager Namespace to retrieve an address or other identifier for the device itself 240 or for a device object 281 associated with the device 240. Using the retrieved address or identifier, the operating system 170 forwards the transaction request for the device 240 either directly, through a device object 281 of the device stack 280, and/or through the virtual bus driver 260. The virtual bus driver 260 may direct the transaction request to the agent 250, which sends the transaction request to the proxy 210 over the network 106. The proxy 210 receives the transaction request from the agent 250, and directs the received transaction request to the stub driver 220. The stub driver 220 then directs the transaction request to the device 240 through the bus driver 230.

The bus driver 230 receives the result of the transaction request from the device 240 and sends the result of the transaction request to the stub driver 220. The stub driver 220 directs the result of the transaction request to the proxy 210, which sends the result of the transaction request to the agent 250 over the network 106. The agent 250 directs the result of the transaction request to the virtual bus driver 260. The virtual bus driver 260 then directs the result of the transaction request to the application 270 either directly or through a device object 281 of the device stack 280.

Thus, the virtual bus driver 260 may receive transaction requests for the device 240 from the application 270 and send results of the transaction requests back to the application 270 (either directly or through a device object 281 of the device stack 280). As such, the application 270 may interact with the virtual bus driver 260 in the same way as with a bus driver for a device that is connected locally to the server 104. The virtual bus driver 260 may hide the fact that it sends transaction requests to the agent 250 and receives the results of the transaction requests from the agent 250 instead of a device that is connected locally to the server 104. As a result, the device 240 connected to the client 102 may appear to the application 270 as if the physical device 240 is connected locally to the server 104.

The Object Manager Namespace (OMN) stores information on symbolic links created for use by the operating system 170, including symbolic links for devices and for applications running on the server 104. The Object Manager Namespace generally includes several different namespaces for storing symbolic link information for applications and devices. For example, the Object Manager Namespace can include namespaces such as: a "Global" namespace used to store symbolic link information for devices and applications that are shared by all user sessions running on the server 104; various "Local" namespaces, each associated with a user session running on the server 104, used to store information for applications used by (and restricted to) the associated user session; and a "Device" namespace used to store symbolic link information on devices and virtual devices accessible by the server 104.

As described herein, symbolic links can be of two types: global or local. Global symbolic links may be available to the entire system (i.e., to all user sessions running on server 104), while local symbolic links may only be seen and accessed by the session for which they are created. For example, "\\GLOBAL??\c:" may be a symbolic link to a device identified as "\Device\HarddiskVolume1". Because "c:" is a symbolic link in the global namespace directory, such a symbolic link may be accessed by the entire system, including all the users logged in through their respective user sessions.

In certain operating systems, such as the Windows operating system, the creation of the symbolic link for a device 240 results in an entry being created in a Global namespace of the Object Manager Namespace. Because the symbolic link is created in the Global namespace, the symbolic link can be access from any user session running on server 104. As a result, the device 240 associated with the symbolic link can be accessed from any user session on the server 104, and/or from any client terminal having an active user session on server 104.

Figure 2B:
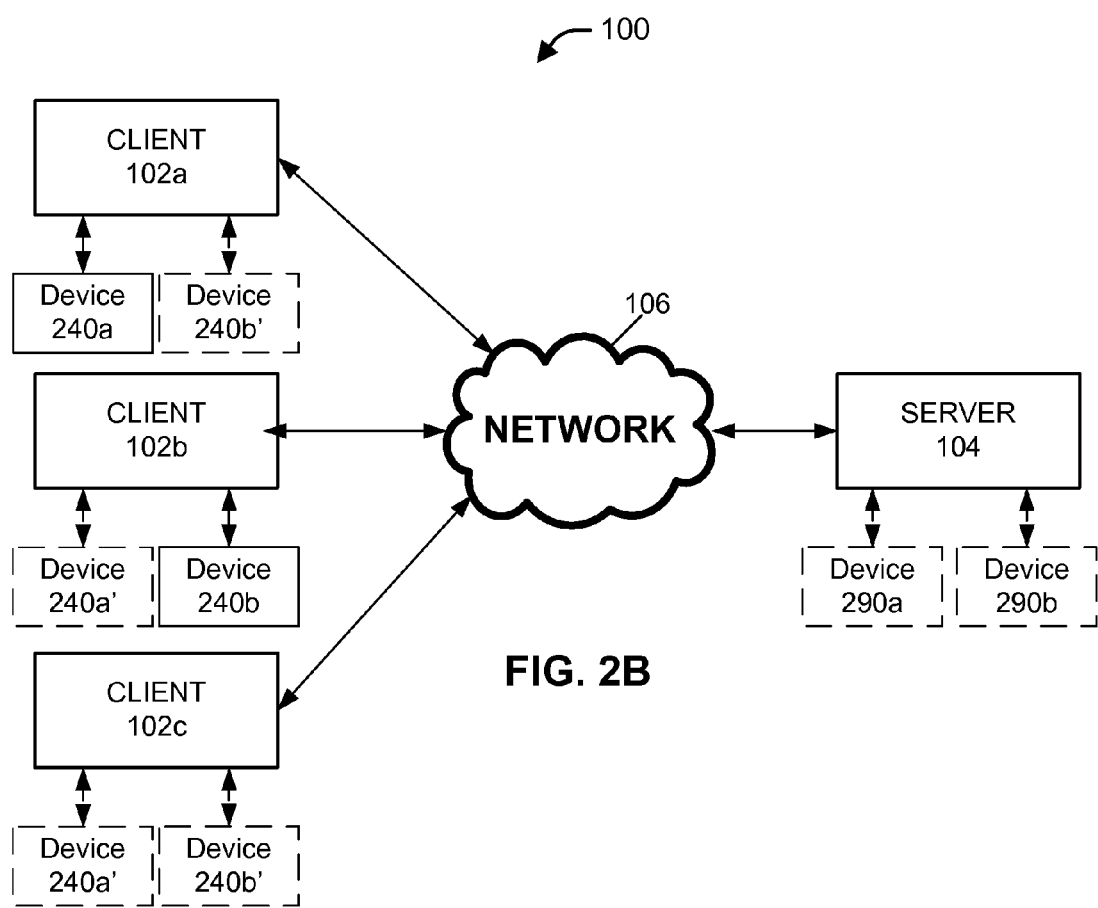
FIG. 2B is a conceptual block diagram of an example of a computer network providing local device virtualization.

FIG. 2B illustratively shows a block diagram of a computer network 100 providing local device virtualization. As previously described in relation to FIG. 1, network 100 includes client terminals 102a, 102b, and 102c, communicating through network 106 with server 104. Each client terminal can have one or more connected devices, such as device 240a connected to client terminal 102a, and device 240b connected to client terminal 102b.

As described in relation to FIG. 2A above, each device 240a, 240b can be virtualized on the server 104 to provide access to the device from a user session on the server 104 through a corresponding virtual device 290a, 290b. For example, when device 240a is connected to client terminal 102a, drivers for device 240a may be loaded in operating system 170 of server 104, the device 240a may be virtualized on server 104 as virtual device 290a, and a symbolic link to the device 240a may be created in the Object Manager Namespace of operating system 170. Once the symbolic link is created, a user of client terminal 102a may be able to access device 240a through a user session on server 104. Similarly, when device 240b is connected to client terminal 102b, a symbolic link to the device 240b may be created in the Object Manager Namespace of operating system 170 of server 104. Once the symbolic link is created, a user of client terminal 102b may be able to access device 240b through a user session on server 104.

The symbolic links to the devices 240a, 240b are created in a Global namespace of the Object Manager Namespace of operating system 170. As a result, the symbolic links and associated devices can be accessed from and used by any user session running on the server 104. For example, as illustratively shown in FIG. 2B, a user of client terminal 102a having a user session on server 104 may access both device 240a as well as virtual device 240b' from the user session. Similarly, a user of client terminal 102*b* having a user session on server 104 may access both device 240*b* as well as virtual device 240*a*' from the user session. Finally, a user of client terminal 102*c* having a user session on server 104 may access both virtual device 240*a*' and 240*b*' from the user session.

Hence, the device virtualization described in relation to FIGS. 2A and 2B provides unrestricted access to devices 240 connected locally to client terminals 102 from any user session on server 104. As such, a redirected device on a terminal server 102 becomes a local device to the server and can be accessed by all the users' sessions connected to that server. For example a printer or a mass storage device, when redirected by one user connected through a session on the server, will show up as a local device and all the users can read/write the mass storage device and print using the printer.

While the unrestricted access enables users of client terminals 102 to share access to and use of devices 240, the device virtualization does not permit a user to restrict access to a device 240. In this respect, the unrestricted device virtualization does not permit secure or private access to the device 240. The device virtualization thus presents security and privacy concerns, as a device 240 may be accessed or used by any number of unauthorized users having user sessions on server 104. In order to address these security and privacy concerns, a device virtualization system may require that a device connected through a session only be accessible in that session.

Figure 3A:
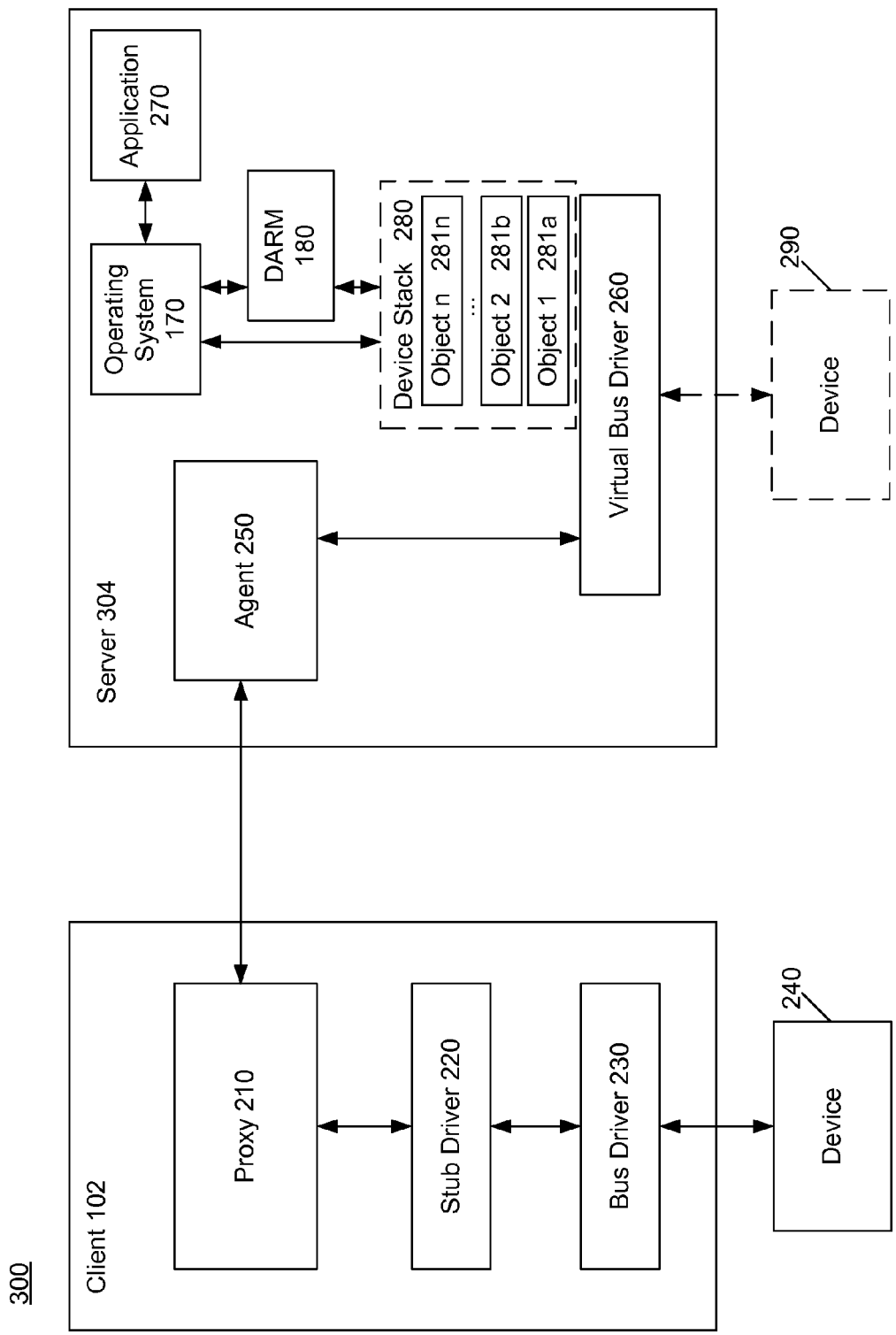
FIG. 3A is a conceptual block diagram of an example of a system for restricting access to a device in a local device virtualization system.

In order to enable restricting access to a device in a local device virtualization system, an enhanced server system is represented in FIG. 3A. FIG. 3A is a block diagram of a system 300 according to the disclosure. The system 300 may include a client 102 in communication with a server 304 over network 106 (illustrated in FIG. 1). The client 102, including proxy 210, stub driver 220, bus driver 230, and one or more optional device(s) 240, is substantially similar to the client 102 shown in and described in relation to FIG. 2A. The server 304 includes agent 250, virtual bus driver 260, device stack 280 including device objects 281*a*, 281*b*, . . . , 281*n*, operating system 170, application 270, and one or more optional virtualized device(s) 290, which function substantially similarly to the corresponding elements of server 104 of FIG. 2A. Server 304 additionally includes a Device Access Restriction Module (DARM) 180 in the communication path between device stack 280 and operating system 170.

Server 304 functions substantially similarly to server 104 (described in relation to FIG. 2A) in terms of loading drivers and device objects for device 240 on the server. However, the similarities in functioning between servers 104 and 304 do not extend to the symbolic link creation process. DARM 180 of server 304 is configured to intercept function calls for creating symbolic links on server 304, and to block the creation by operating system 170 of symbolic links for devices 240 that are virtualized on virtual bus driver 260. DARM 180 can thus restrict a redirected device to be only accessible from the user session (e.g., a Microsoft windows terminal server session) it is redirected from. DARM 180 functions independently of the particular remote session protocol used in communications between client 102 and server 304 (e.g., RDP or ICA or any other).

When a device object 281 issues a call to the symbolic link creation function (e.g., a call to the function IOCreateSymbolicLink( )), the call is intercepted and redirected to the DARM 180 instead of invoking the symbolic link creation module of the operating system 170. As a result of the redirection, the symbolic link creation process that is generally undertaken by a module of the operating system 170 may not be performed. Instead, DARM 180 may perform an alternate symbolic creation process.

Upon receiving the redirected call to the symbolic link creation function, DARM 180 determines whether the symbolic link creation call is for a device object 281. If the call does not relate to a device object, DARM 180 may forward the call to the symbolic link creation module of operating system 170, and the symbolic link creation module of the operating system may create a symbolic link. For example, a call for creating a symbolic link to an application running on the server 304 may be a call that does not relate to a device object, and such a call may be forwarded to the symbolic link creation module of operating system 170 for creation of a symbolic link as described above in relation to FIG. 2A.

If the call relates to symbolic link creation for a device object, DARM 180 may traverse the device stack 280 in order to identify the bus driver that the target device's device stack is associated with. A server 304 can include multiple bus driver, including for example one or more of a USB bus driver, a PCMCIA bus driver, a COM bus driver, or the like. The server 304 also includes virtual bus driver 260. If DARM 180 determines that the device stack for the target device is not associated with virtual bus driver 260, DARM 180 may forward the call to the symbolic link creation module of operating system 170 and the symbolic link creation module of the operating system may create a symbolic link. However, if DARM 180 determines that the device stack is associated with virtual bus driver 260, DARM 180 obtains device configuration data for the target device, and create a symbolic link for the target device based on the device configuration data. If the device configuration data indicates that the device should be local or restricted, for example, a local symbolic link can be created in one or more local namespaces of the Object Manager Namespace. However, if the device configuration data indicates that the device should be shared, a global symbolic link can be created in the Object Manager Namespace.

Hence, DARM 180 enables symbolic links for devices 240 to be selectively created in global or local namespaces of the Object Manager Namespace. Devices having symbolic links created in the Global namespace will be accessible from any user session running on server 104. However, devices having symbolic links created in local namespaces will only be accessible from user sessions associated with the corresponding local namespaces. As such, privacy and security of devices can be provided.

In one aspect, a Microsoft terminal server technology and license can provide a way for many users to connect to the same server using the same user account or different user accounts. A device can be redirected to a terminal server, where many users may be connected. The device may only be accessible from the terminal session it got redirected from. All the other user sessions may be able to see the presence of the device using some tools, but may not be able to access the device. The DARM 180 may thus keep the device access restricted to a session, which is redirected on the terminal server, and may thus only allow the access to the device to the terminal server session from which it is redirected. The session level restriction can enable the device to be accessed by the tools and processes which are executing in the same session, and/or using windows supported interface to devices from the same session. From other users' sessions, however, the device may not be accessible to the tools or processes using the Windows supported interfaces to device. By restricting access to the device such that access is only granted to the particular client/session the device is physically connected to/through, DARM 180 provides private session-based access to the device. In addition, by verifying the identity of a session seeking to access the device through the symbolic link and by blocking unauthorized access to the device from unauthorized or unassociated user sessions, including both read access and write access, DARM 180 provides secure access to the device.

Figure 3B:
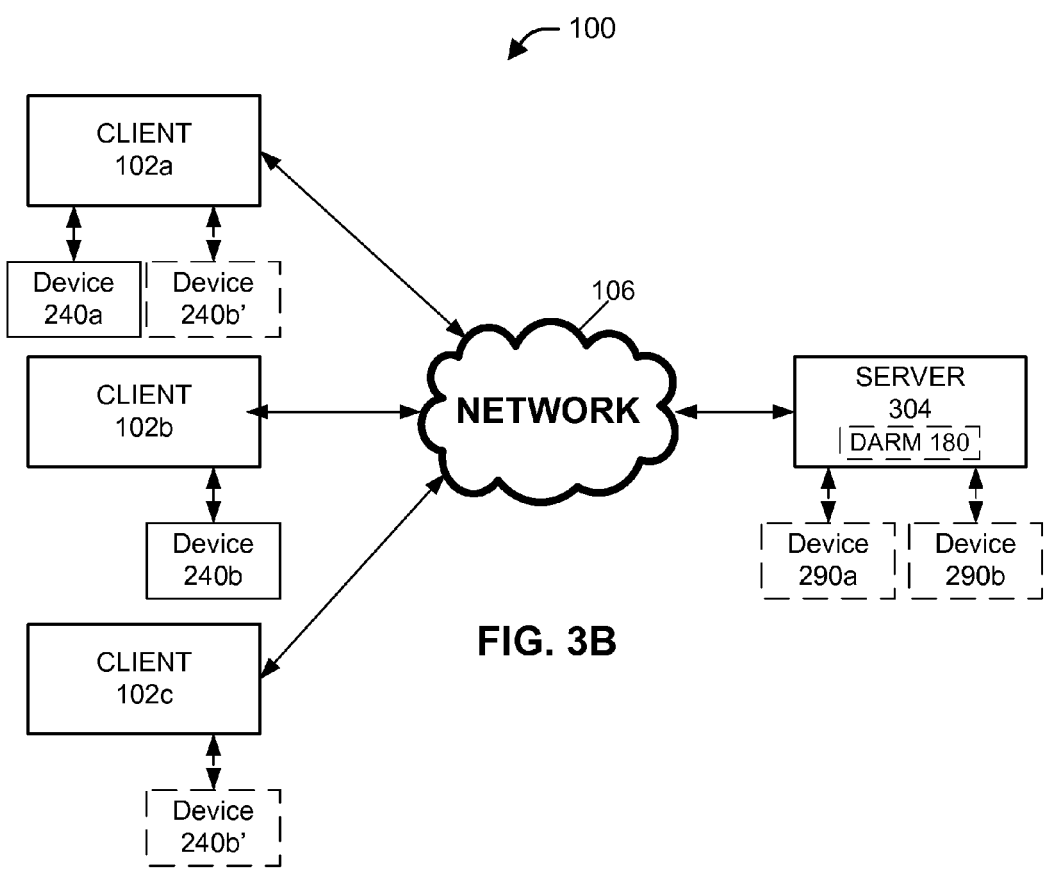
FIG. 3B is a conceptual block diagram of an example of a computer network providing restricted access to virtualized local devices.

FIG. 3B shows a block diagram of a computer network 100 providing restricted access to virtualized local devices. As previously described in relation to FIG. 2B, network 100 includes client terminals 102a, 102b, and 102c, communicating through network 106 with a server. Each client terminal can have one or more connected devices, such as device 240a connected to client terminal 102a, and device 240b connected to client terminal 102b.

In FIG. 3B, the server 304 is configured to provide restricted access to virtualized local devices. As such, server 304 includes a Device Access Restriction Module (DARM) 180 for intercepting calls for creating symbolic links on server 304. When device 240a is connected to client 102a, a corresponding virtualized device 290a is created on server 304. The function call for creating a symbolic link to device 240a, however, is intercepted by the DARM 180. DARM 180 determines whether the symbolic link creation call is for a device object, traverses the device stack to identify that the device object is associated with the virtual bus driver 260, and obtains device configuration data for the target device. In the example of FIG. 3B, the device configuration data associated with device 240a indicates that the device is a local device or a device to be restricted. A symbolic link for device 240a is therefore created by DARM 180 in a local namespace associated with the user session of client terminal 102a in the OMN of server 304. Because the symbolic link is created in a local namespace associated with the user session of client terminal 102a, device 240a is only accessible from client terminal 102a.

When device 240b is connected to client terminal 102b, a corresponding virtualized device 290b is created on server 304. As in the case of device 240a described above, the function call for creating a symbolic link to device 240b is intercepted by the DARM 180. The device configuration data associated with device 240b, however, may indicate that the device is a global device. A symbolic link for device 240b is therefore created in a global namespace of server 304. Because the symbolic link is created in a global namespace, device 240b is not only accessible from a user session running on client terminal 102b, but is also accessible as a virtual device 240b' from user sessions on client terminals 102a and 102c.

Figure 4A:
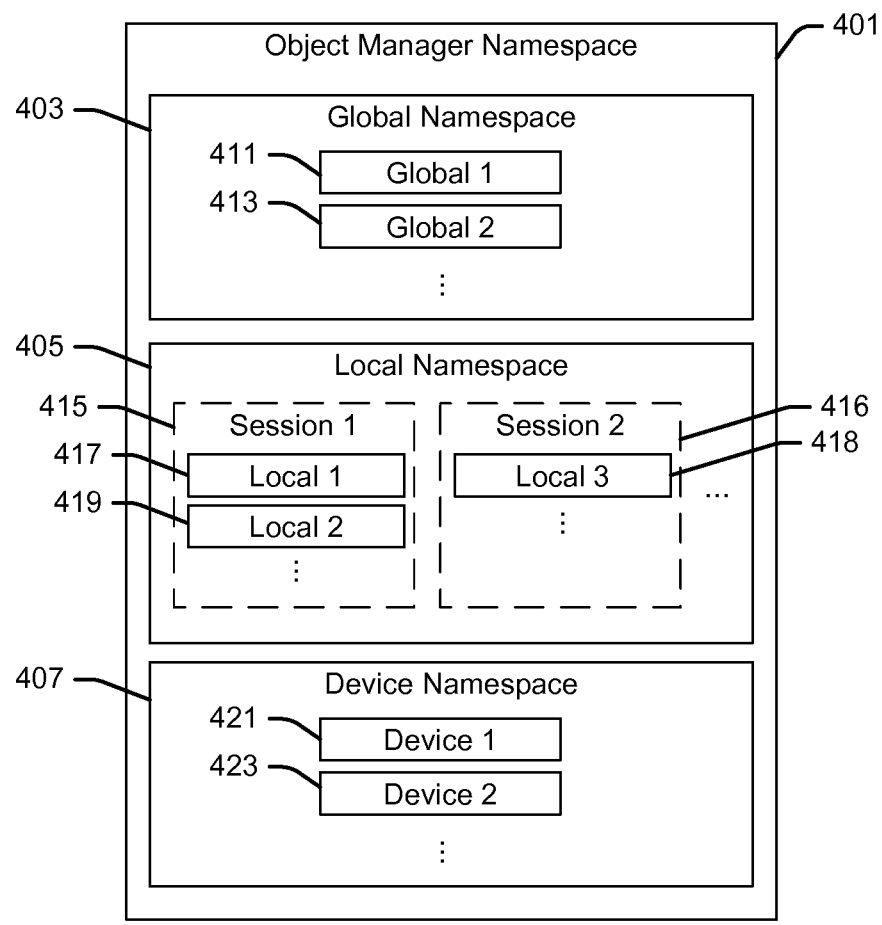
FIG. 4A is a conceptual block diagram of an example of a data structure for storing an object manager namespace.
Figure 4B:
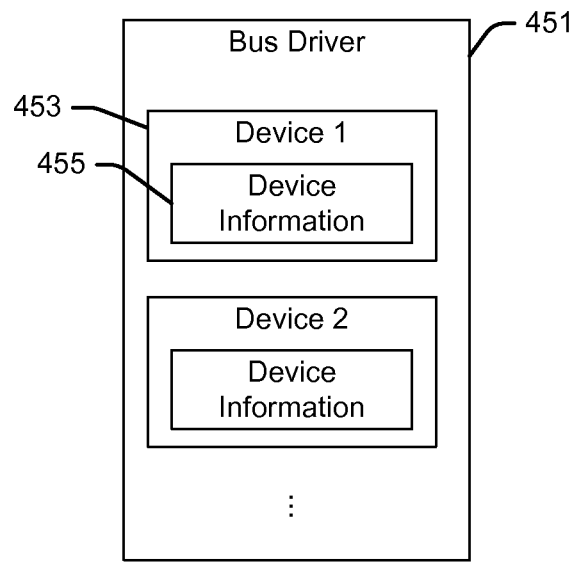
FIG. 4B is a conceptual block diagram of an example of a data structure for storing device configuration data of a virtual bus driver.
Figure 4C:
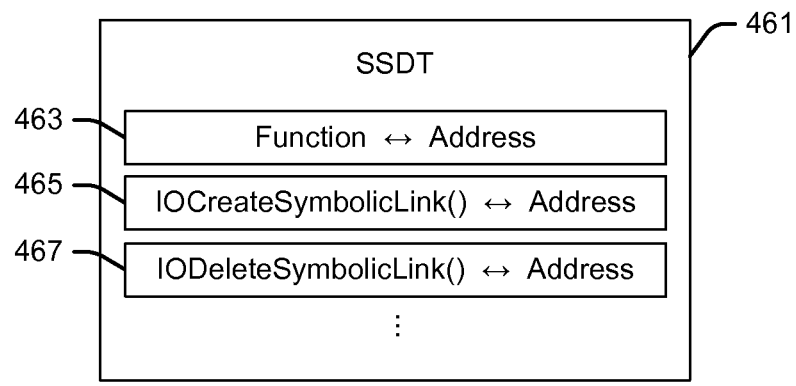
FIG. 4C is a conceptual block diagram of an example of a system service description table (SSDT).

FIGS. 4A-4C respectively show data structures for storing an object manager namespace 401, device configuration data of a virtual bus driver 451, and a system service description table (SSDT) 461, in accordance with various aspects of the subject technology.

FIG. 4A illustratively shows a data structure for storing an Object Manager Namespace 401 of server 304. The data structure is generally resident in and stored in a memory of server 304. For example, OMN 401 may be stored in a random access memory of server 304. The Object Manager Namespace 401 stores records for devices, applications, and/or other components or objects that are running on or accessible from an associated operating system (such as operating system 170) or computer (such as server 304). The records contained in the Object Manager Namespace 401 are organized in one or more of a global namespace 403, a local namespace 405, and a device namespace 407. Global namespace 403 includes records or entries 411, 413 for objects that are shared between all user sessions on the operating system or computer. As such, devices, applications, or other objects having entries in the global namespace can be accessed by any user, or from any user session, on the operating system 170 or computer (e.g., server 304). Local namespace 405 includes records or entries 417, 418, 419 for objects that are specific to one or more user sessions on the operating system or computer. As such, devices, applications, or other objects having entries in the local namespace can only be accessed by the particular session(s) that they are associated with. In the example of FIG. 4A, for example, records or entries 417 and 419 are associated with a first user session 415, while record or entry 418 is associated with a different user session 416. Finally, device namespace 407 includes records or entries 421, 423 for all device objects that are running on or accessible from the operating system or computer. As such, devices objects having entries in the global 403 or local namespaces 405 also have corresponding entries in the device namespace 407.

FIG. 4B illustratively shows data structure 451 for storing device configuration data of a virtual bus driver, such as virtual bus driver 260 of FIGS. 2A and 3A. The data structure 451 is generally resident in and stored in a memory of the server 104, 304 associated with the virtual bus driver. The data structure 451 can include a record or entry 453 for each virtualized device connected to or resident on the virtual bus. Each entry 453 stores device information 455 associated with the corresponding virtualized device. The device information can include a physical address for the device, one or more session identifiers associated with the device (e.g., a session LUID or session number), a device descriptor (e.g., product ID, vendor ID, and/or other information), a configuration descriptor, an interface descriptor, an endpoint descriptor and/or a string descriptor. The device information can also include device configuration data, such as the device configuration data used to determine whether a device should be restricted.

FIG. 4C illustratively shows a block diagram for a system service description table (SSDT) 461. The SSDT 461 includes one or more entries 463, 465, 467, each entry storing an association between a particular function call and an address. The address may be an address for a location in a memory of a computer, such as server 304, storing instructions related to the function call. For example, entry 465 may be associated with the function IOCreateSymbolicLink( ), and may store the address of a location in memory storing instructions for performing the associated function. Entry 467 may be associated with the function IODeleteSymbolicLink( ), and may store the address of a location in memory storing instructions for performing the associated function. The SSDT 461 is used by the operating system 170 to direct received function calls to the proper location in memory. For example, when operating system 170 receives a call for the function IOCreateSymbolicLink( ), operating system 170 may retrieve entry 465 to identify the memory location associated with the function. Upon retrieving the memory location identified in entry 465, operating system 170 may forward the call to the retrieved memory location. By default, entries 465 and 467 may indicate memory locations respectively associated with a symbolic link creation module of the operating system 170 and with a symbolic link deletion module of the operating system 170.

Figure 5A:
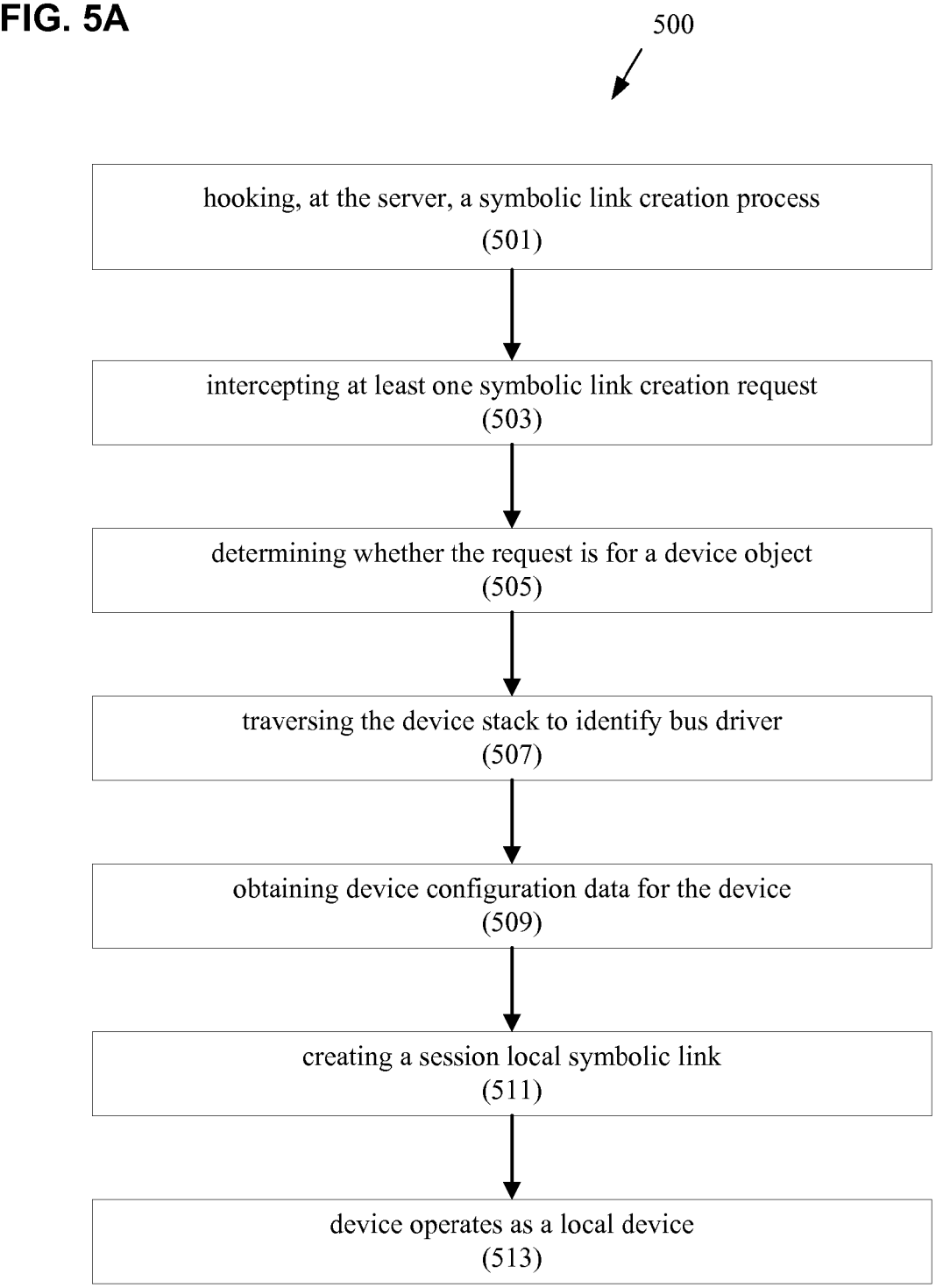
FIG. 5A is a flowchart illustrating an exemplary method for restricting access to a device.

FIG. 5A is a flowchart illustrating an exemplary method 500 for restricting access to a device, in accordance with various aspects of the subject technology. Method 500 can be implemented by one or more processors on server 304, for example.

Method 500 begins with operation 501, in which a symbolic link creation process is hooked on the server 304. Function calls to a symbolic link creation function (such as call to a IOCreateSymbolicLink( ) function) are generally, by default, directed to a symbolic link creation module of an operating system 170 running on server 304. However, the hooking operation results in function calls to the symbolic link creation function being redirected to (or intercepted by) a Device Access Restriction Module (DARM) 180 of server 304. As a result, once the hooking operation is successfully completed, functions calls to IOCreateSymbolicLink( ) are intercepted and redirected to a symbolic link creation module of the DARM 180. In a server 304 having a system service description table such as SSDT 461, for example, the hooking operation may include modifying an entry in the SSDT associated with a symbolic link creation function, such as entry 465. In particular, the hooking operation can include changing the address stored in entry 465 from an original address pointing to the symbolic link creation module of the operating system 170 (or pointing to a location in memory storing instructions to perform operations of the symbolic link creation module of the operating system 170), to a new address pointing to the symbolic link creation module of the DARM 180 (or pointing to a location in memory storing instructions to perform operations of the symbolic link creation module of the DARM 180). In addition, the hooking operation can also include recording in a memory accessible by DARM 180 the original address stored in entry 465, to enable DARM 180 to make functions calls to the symbolic link creation module of the operating system 170.

Once the hooking is completed (operation 501), all function calls for symbolic link creation in server 304 are intercepted and redirected to the symbolic link creation module of DARM 180. Operations 503-513 may then be completed by various modules of the DARM 180. In operation 503, one or more such symbolic link creation request(s) are intercepted and redirected to DARM 180. In general, the symbolic link creation function call may include arguments such as a name for the symbolic link (e.g., "\\GLOBAL??\C:"), and an object name associated with the symbolic link (e.g., "\Device\HarddiskVolume1"). The object name may be the name of a device object (e.g., device object 281) or of a device (e.g., device 240 or 290), or the object name can refer to another type of object such as a section object, an event object, or the like. As part of the intercepting operation, the arguments included as part of the original symbolic link creation function call are provided to the DARM 180.

In response to receiving an intercepted symbolic link creation request, the DARM determines whether the request is for a device object in operation 505. The DARM may determine that the request is for a device object based on the name for the object (i.e., the "Object Name") included as an argument as part of the symbolic link creation function call. In one example, the DARM may search for the Object Name in the OMN and, once a match with the name is located in the OMN, determine whether the matching entry in the OMN is for a device object. The DARM may consult the Object Manager Namespace 401 of the server 304, use the Object Name to retrieve an entry in the namespace that is associated with the object, and based on the retrieved entry, determine whether or not the associated object is a device object. In general, the DARM may determine that a request relating to an application (and/or associated with an application in the OMN), for example, is not for a device object. Similarly, the DARM may determine that a request relating to a section object or to an event object is not for a device object. If the DARM determines that the request is for a device object, operation proceeds to operation 507. However, if the DARM determines that the request is not for a device object, the DARM may forward the symbolic link creation request to the symbolic link creation module of the operating system 170 (e.g., by forwarding the request to the original address stored in entry 465) for a symbolic link to be created according to the operating system's normal process.

In operation 507, the DARM 180 traverses the device stack associated with the device object to identify the bus driver on which the device stack is formed. The traversal of the device stack may involve identifying the driver having created the symbolic link creation request, and identifying other drivers associated with the identified driver and/or with the address identified in the request.

In one aspect, the traversal of the device stack is performed downwards, starting from the device object retrieved in the previous operation (operation 505). The traversal is accompanied by checking whether the device stack ends at (or includes) a device object which is created by a driver of the virtual bus driver 260. The traversing down from the device object enables the DARM 180 to check whether the device object corresponds to a device that is a redirected device by virtual bus driver 260. If the device is determined to be a redirected device, the DARM 180 also obtains a reference to the device which can be used in a following operation (such as in operation 509). The traversal of the stack can be used to identify the first device object for a redirected device, i.e. the device object that is created by the virtual bus or associated with a virtual bus driver, because the first device object can include more details, information, and/or data about the device.

In operation 509, device configuration data for the device is obtained by the DARM 180. The device configuration data generally includes an indication of whether access to a device should be shared or restricted on server 304. The device configuration data can be obtained from the virtual bus driver 260. Alternatively, the device configuration data may be obtained from a memory of the server 104, from a user-input of device configuration data, or the like. In the case of user-input configuration data, the device configuration data can be input by a user of the client terminal 102 having the device 240 connected, for example in response to a prompt being presented to the user at the time the device 240 is connected to the client 120 and asking the user for device configuration data to be provided. The obtained device configuration data may correspond to the particular device object (e.g., device configuration data indicating that a particular device is to be shared or restricted), to a type of the device object (e.g., device configuration data indicating whether all storage devices, all peripheral devices (e.g., camera, mouse, etc.), and/or other types of device objects are to be shared or restricted), to a particular user (e.g., device configuration data indicating that devices connected to client terminals associated with particular user sessions are to be shared or restricted), to particular types of users (e.g., device configuration data indicating that access to the device from user sessions of users having administrator access privileges should not be restricted), to default configuration data (e.g., device configuration data indicating that all devices not having device-specific configuration data are to be shared or restricted), or other appropriate user data.

Once the device configuration data is obtained, DARM 180 checks whether the device's access is configured to be restricted to the user's session based on the obtained configuration data. If device access is to be restricted to the user's session, DARM 180 proceeds to operation 511. However, if device access is not to be restricted (e.g., if the configuration data indicates that access to the device is to be granted to all user sessions on server 104), DARM 180 may forward the symbolic link creation request to the symbolic link creation module of the operating system 170 (e.g., by forwarding the request to the original address stored in entry 465) for an unrestricted symbolic link to be created according to the operating system's normal process. The device configuration data can be retrieved based on a device reference, or other identifier for a device, for a device type, for a user session associated with the device, or the like. If a device is determined to be configured to be restricted, DARM 180 may retrieve device information including the session Local Unit Identifier (LUID) or session number of the session that the device is connected through, so as to restrict access to the device such that only a session associated with the retrieved LUID or number may access the device.

In operation 511, DARM 180 creates a symbolic link that is local to the session associated with the device. Operation 511 is performed when the device configuration data indicates that access to the device should be restricted, so as to block the creation of an unrestricted (or global) symbolic link and enable creation of a session local symbolic link with the same name.

In order to create a local symbolic link, DARM 180 creates a symbolic link for the device in the local namespace (e.g., local namespace 405) of the object manager namespace 401 of the operating system 170. In particular, DARM 180 creates a symbolic link associated with the particular session associated with the device, such as the user session through which the device is connecting to the server 104. The particular session may correspond to the session LUID or session number identified in operation 509, for example. As such, DARM 180 avoids the creation of the symbolic link in the global namespace (e.g., global namespace 403) by changing the directory part in the requested Symbolic Link, such that the symbolic link is created in a session local directory of the local namespace instead of being created in the global directory.

Following creation of the session local symbolic link, the device 240 operates as a session local device in operation 513. When operating system 170 receives a request to access a device 240 using a symbolic link, the operating system 170 determines a user session associated with the request (e.g., by identifying a LUID or session number for the user session) and retrieves the determined session's local namespace. The operating system 170 then determines whether the symbolic link identified in the request is included in the determined session's local namespace. If the symbolic link is found in the determined session's local namespace, the operating system 170 may grant access to the device object associated with the symbolic link by forwarding the request to the device 240. If the symbolic link is not found in the session's local namespace, the operating system can search the global namespace for the symbolic link. If the symbolic link is found in the global namespace, the operating system 170 may grant access to the device object associated with the symbolic link by forwarding the request to the device 240. If the symbolic link is neither found in the determined session's local namespace nor found in the global namespace, the operating system 170 returns an error message indicating that the symbolic link and/or associated device is not present on the system.

In particular, the operating system will generally not search for the symbolic link in other sessions' local namespaces. As a result, a device for which the symbolic link is created in one session's local namespace may be virtually invisible to all the other sessions. A request to access the device (or the device's symbolic link) from any session other than the one session can result in the operating system returning the same error message that the operating system returns when a device is not at all present on the system (e.g., a device not found error message).

Figure 5B:
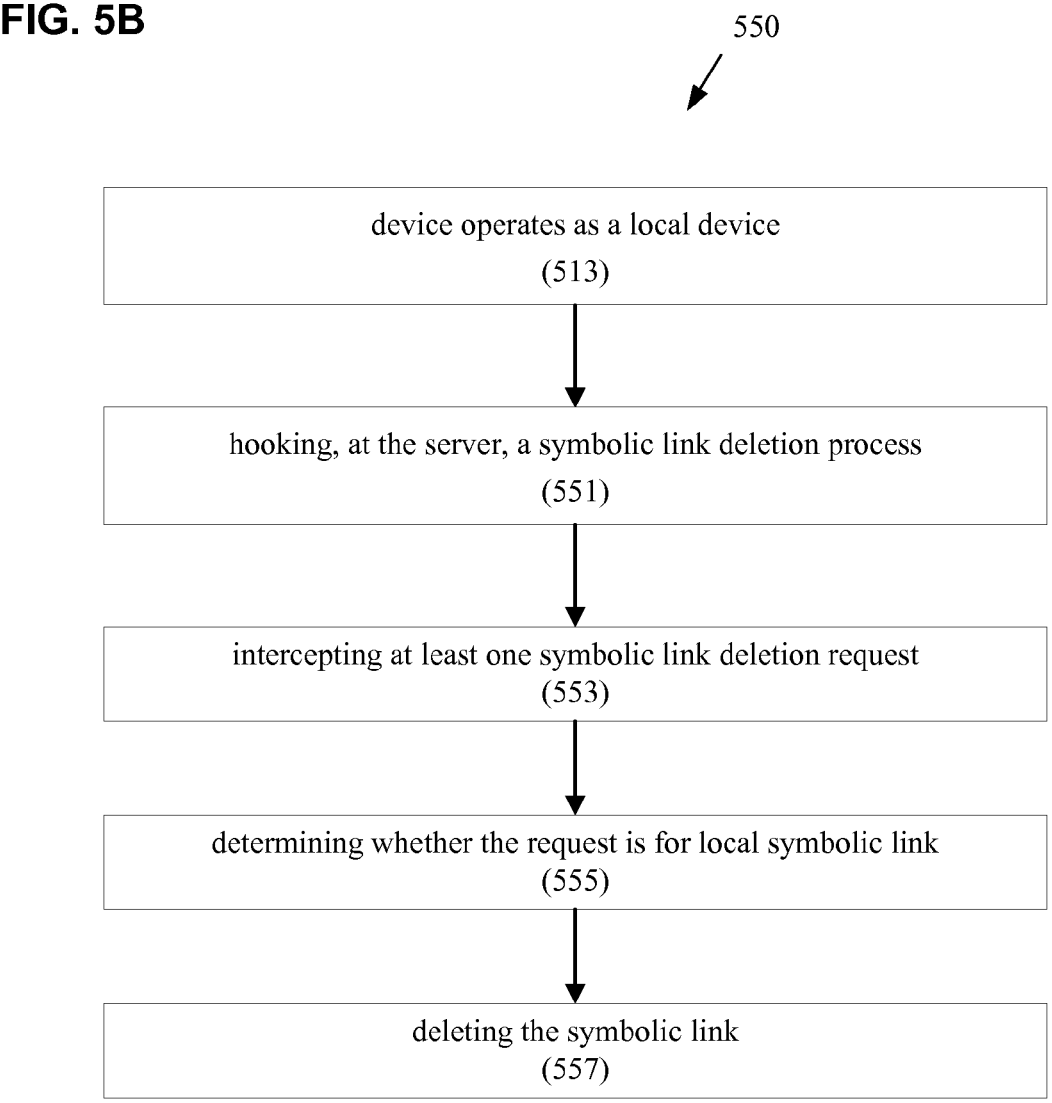
FIG. 5B is a flowchart illustrating an exemplary method for deleting a symbolic link to a device having restricted access.

FIG. 5B is a flowchart illustrating an exemplary method 550 for deleting or removing a symbolic link to a device having restricted access, in accordance with various aspects of the subject technology. Method 550 can be implemented by one or more processors on server 304, for example. While method 550 is described separately from method 500, the two methods can be integrated together such that one or more operations of method 550 may be performed at substantially the same time as corresponding operations of method 500. The methods 500, 550 may also be performed sequentially.

Method 550 begins with operation 513 in which a device 240 operates as a session local device. Operation 513 is substantially similar to operation 513 described in relation to method 500, and reference can therefore be made to the description of operation 513 provided above in relation to method 500.

In operation 551, a symbolic link deletion process is hooked on the server 304. The hooking process is substantially similar to the hooking process described in relation to operation 501 above, though hooking in operation 551 is performed with respect to a symbolic link deletion or removal function (such as call to a IODeleteSymbolicLink( ) function). The hooking operation results in function calls to the symbolic link deletion function being redirected to (or intercepted by) the Device Access Restriction Module (DARM) 180 of server 304. As a result, once the hooking operation is successfully completed, functions calls to IODeleteSymbolicLink( ) are intercepted and redirected to a symbolic link deletion module of the DARM 180. In a server 304 having a system service description table such as SSDT 461, for example, the hooking operation may include modifying an entry in the SSDT associated with a symbolic link deletion function, such as entry 467. In particular, the hooking operation can include changing the address of entry 467 from an original address pointing to the symbolic link deletion module of the operating system 170 (or pointing to a location in memory storing instructions to perform operations of the symbolic link deletion module of the operating system 170), to a new address pointing to the symbolic link deletion module of the DARM 180 (or pointing to a location in memory storing instructions to perform operations of the symbolic link deletion module of the DARM 180). In addition, the hooking operation can also include recording in a memory accessible by DARM 180 the original address stored in entry 467, to enable DARM 180 to make functions calls to the symbolic link deletion module of the operating system 170.

While operation 551 is shown in FIG. 5B as occurring after operation 513, the order of the operations may be modified. For example, operation 551 may take place before operation 513, for example by taking place at substantially the same time as operation 501 of method 500.

Operations 553-557 may take place at any time after operations 511 and 551 have been completed. In the flow diagram of method 550, for example, operation 553 may take place after operation 551. In operation 553, one or more such symbolic link deletion request(s) are intercepted and redirected to DARM 180. In general, the symbolic link deletion function call may include argument(s) such as a name for a symbolic link (e.g., "\\GLOBAL??\C:"). As part of the intercepting operation, the argument(s) included as part of the original symbolic link deletion function call are provided to the DARM 180.

In operation 555, the DARM 180 determines whether the intercepted symbolic link deletion request is for a local symbolic link created by the DARM (e.g., a symbolic link created as part of operation 511). The DARM 180 can perform the determination by checking whether the symbolic link is included in either a global namespace (e.g., global namespace 403) or a local namespace (e.g., local namespace 405) of an object manager namespace 401. If the symbolic link is located in the global namespace, the symbolic link is determined to be a global link. Conversely, if the symbolic link is located in the local namespace, the symbolic link is determined to be a local link. If the symbolic link is determined to be global, the DARM may forward the symbolic link deletion request to the symbolic link deletion module of the operating system 170 (e.g., by forwarding the request to the original address stored in entry 467) for the symbolic link to be deleted or removed according to the operating system's normal process. However, if the symbolic link is determined to be local, the DARM 180 may proceed to operation 557.

In operation 557, the local symbolic link is deleted. In particular, the DARM 180 may check the local namespace 405 of the object manager namespace 401, and clean up or remove all instances of the symbolic link from the local namespace. The DARM may perform the deletion, removal, and/or clean up process to ensure that all instances are removed from the local namespace. In contrast, a symbolic link deletion module of an operating system 170 may only delete symbolic links from a global namespace of an object manager namespace, and thereby fail to properly remove a local symbolic link.

The processes of methods 500 and 550 provide for symbolic links and device interfaces to be created by a device driver to provide user programs to the device. The symbolic links and device interfaces are generally kept in a Global directory (\GLOBAL??) of an object manager namespace to provide a system wide access to the devices from any user session on the server. DARM 180, however, checks the process of creation of symbolic links and device interfaces and restricts the device access to the session for which it is redirected based on the configuration data for the device. In particular, DARM 180 hooks the symbolic link creation and removal APIs and system calls, which are used by the device drivers in operating systems (such as Windows operating systems) to create the symbolic links and device interfaces, to redirected the APIs and system calls to the DARM. When a device is redirected, an intercept or redirection module records the session number and/or Session LUID, which specifies from which session the system call got redirected from. The session information is saved with the rest of the device information in the virtual bus driver. When a new symbolic link or device interface is created for a new device object, DARM 180 can intercept it, and can verify if the device object created by the driver is a device object mounted over a virtual bus, either directly or indirectly. The verification is accomplished by parsing all the device objects until a device object corresponding to a virtual bus device object is reached, or until the root (bottom) device is reached. If the virtual bus created device object is reached in the device stack, DARM 180 can collect more information about the device, can check if the device is selected by the user not to be shared, and can keep the access restricted to only a user's session. If the device object is identified to be one for which access is to be restricted, the DARM can block the creation of the symbolic link requested by the driver and can instead create a local symbolic link for the session from which the device is redirected. DARM 180 performs similar operations at the time of removal of the symbolic link or device interface, so as to clean up the symbolic link and device interface created by the DARM in the local session directories. The processes of methods 500 and 550 thus provide examples of systems and methods for providing secure, private, session-based access to devices, such as USB devices and local devices.

Figure 6:
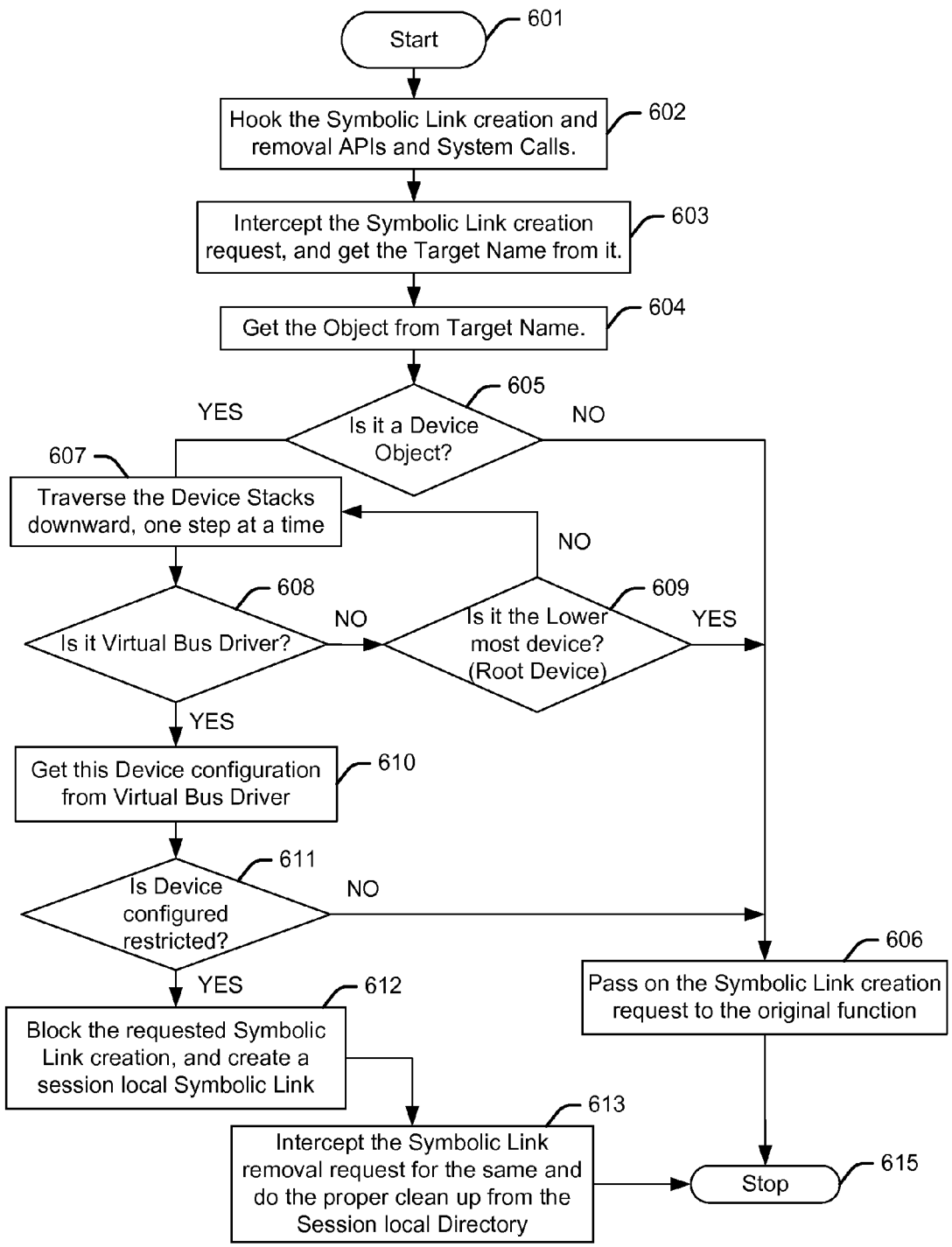
FIG. 6 is a flowchart illustrating an exemplary method for restricting access to a device and for deleting a symbolic link to a device having restricted access.

FIG. 6 is a flowchart illustrating an exemplary method 600 for restricting access to a device and for deleting a symbolic link to a device having restricted access, in accordance with various aspects of the subject technology. The method 600 shows methods that are similar to those described in relation to methods 500 and 550 of FIGS. 5A and 5B above.

Method 600 begins with operation 601. The DARM hooks the symbolic link creation and removal (or deletion) application programming interfaces (APIs) and system calls in operation 602. In particular, operation 602 can include hooking (or modifying) the symbolic link creation and removal APIs and system calls, in order to keep check on all new symbolic links or device interfaces being created. The hooking provides a comprehensive mechanism not to let any symbolic link or device interface getting created without check. In operation 603, the DARM intercepts a symbolic link or device interface creation request, and obtains the target name from the request. After the hooking operation is complete, all symbolic link and device interface creation requests will come to the DARM 180 first, and will then be redirected based on the device. From the creation request, the DARM can fetch the symbolic link directory and name to be created and a target name to which (or for which) the symbolic link is being created. DARM 180 can thereby intercept and block the creation of a symbolic link until the device details are identified. DARM 180 can also get the target name of the symbolic link, which can be used to discover more details about the device.

The DARM can use the target name to determine the object associated with the request (operation 604), and determine whether the object is a device object (operation 605). In particular, DARM 180 can identify the object from the target name, and verify if the object is a device object. DARM 180 may parse the object manager namespace 401, and search for the object in the OMN. After the object is found, the DARM 180 can check if the object is a device object. DARM 180 can get (or retrieve or identify) the device object for which the symbolic link is being created, which can help in reaching (or identifying) the first device object created for the device 240. If the identified object is not a device object, then the DARM 180 may not need to do anything and can pass control of the symbolic link creation operation to the original function, i.e., to the symbolic link creation function of the operating system. If the object is not a device object, the symbolic link creation request is passed on to the original symbolic link creation function, such as a symbolic link creation function implemented by the operating system (operation 606).

However, if the object is a device object, the DARM traverses the device stacks downward, one step at a time (operation 607). At each step, the DARM determines whether the driver for the current device, in the stack, is a virtual bus driver (operation 608), such as a TCX USB bus driver. If the driver for the current device is not a virtual bus driver, DARM determines whether the current device is the lowest-level device in the device stack (i.e., the root device). If the lower most device in the stack is reached (operation 609), the DARM proceeds to operation 606. However, if the current device is not the lowest device, the DARM proceeds to operation 607 to retrieve the next lower device from the stack. In operation 608, if the driver for the current device is determined to be a virtual bus driver, the DARM retrieves the configuration data for the device from the virtual bus driver (operation 610), and determines whether the device is to be restricted based on the configuration data (operation 611). In the case of a device to be restricted, the DARM blocks the requested symbolic link creation process, and instead creates a session local symbolic link (operation 612). In the case of a non-restricted device, the DARM passes the symbolic link creation request on to the original symbolic link creation function (operation 606), such as a symbolic link creation function implemented by the operating system. In the case that a session local symbolic link is created (operation 612), the DARM is further configured to intercept a symbolic link removal request for the local symbolic link, and to do the proper clean up from the session local directory of an object manager namespace (operation 613). Once either of operations 606 or 613 are completed, operation ends (operation 615).

The systems and methods described herein may additionally or alternatively be used to provide private session-based access to local devices. In one aspect, a device 240 may be connected directly to a bus driver of a server, such as server 304. In the example, the device 240 may be a USB device connected to a USB bus of the server, a PCMCIA device connected to a PCMCIA bus of the server, a COM device connected to a COM bus of the server, or another appropriate type of local device that is locally connected to the server. A device stack including device objects having associated device drivers may be created for the device on the bus driver. A symbolic link creation process may be hooked by a DARM on the server, such that a symbolic link creation request for the device is intercepted and redirected to the DARM. The DARM may determine that the request is for a device object, may traverse the device stack to identify the bus driver, and may obtain device configuration data for the device. If the DARM is configured to create symbolic links for devices connected to the bus driver having the local device, and if the configuration data indicates that access to the device should be restricted to one or more sessions, the DARM may create one or more local symbolic links for the device in the appropriate local namespaces of the server's object manager namespace. Once created, the local symbolic link may restrict access to the local device from only those user sessions associated with the symbolic link in the object manager namespace. In one example, access to a device locally connected to the server may be restricted such that the device may be accessed from only certain user sessions (and from only certain client terminals connected through those user sessions) on the server.

Figure 7:
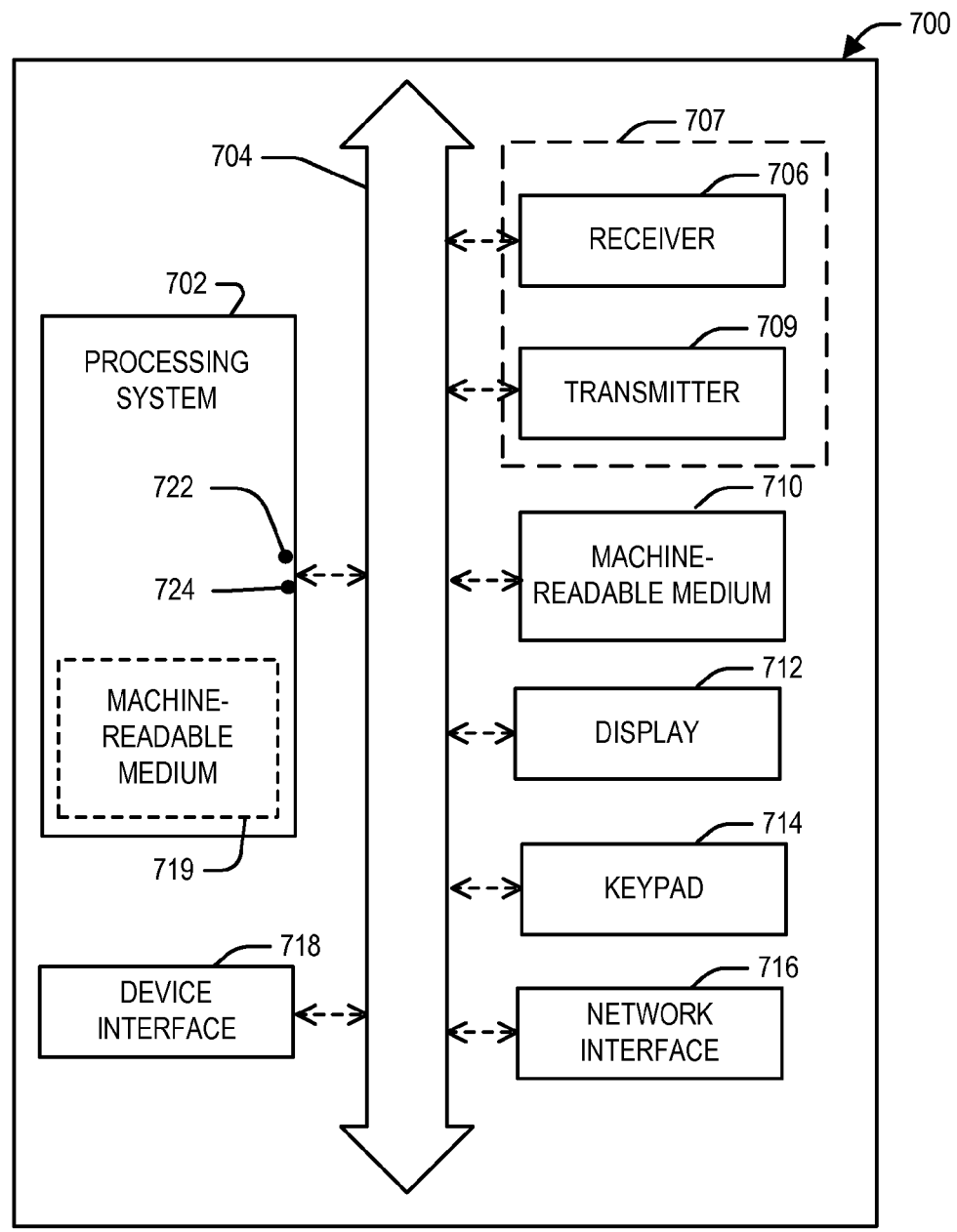

FIG. 7 is a conceptual block diagram illustrating an example of a system 700, in accordance with various aspects of the subject technology. The system 700 may be, for example, a client 102 or a server 104/304.

The system 700 includes a processing system 702. The processing system 702 is capable of communication with a receiver 706 and a transmitter 709 through a bus 704 or other structures or devices. It should be understood that communication means other than busses can be utilized with the disclosed configurations. The processing system 702 can generate audio, video, multimedia, and/or other types of data to be provided to the transmitter 709 for communication. In addition, audio, video, multimedia, and/or other types of data can be received at the receiver 706, and processed by the processing system 702.

The processing system 702 may include a general-purpose processor or a specific-purpose processor for executing instructions and may further include a machine-readable medium 719, such as a volatile or non-volatile memory, for storing data and/or instructions for software programs. The instructions, which may be stored in a machine-readable medium 710 and/or 719, may be executed by the processing system 702 to control and manage access to the various networks, as well as provide other communication and processing functions. The instructions may also include instructions executed by the processing system 702 for various user interface devices, such as a display 712 and a keypad 714. For the example of a client 102, the display 712 may be used to locally display the virtual desktop environment at the client 102, and the keypad 714 may be used to receive user input command, which may be forwarded to the server 104/304 over the network 106. The processing system 702 may include an input port 722 and an output port 724. Each of the input port 722 and the output port 724 may include one or more ports. The input port 722 and the output port 724 may be the same port (e.g., a bi-directional port) or may be different ports.

The processing system 702 may be implemented using software, hardware, or a combination of both. By way of example, the processing system 702 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 719) may include storage integrated into a processing system, such as might be the case with an ASIC. Machine-readable media (e.g., 710) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 702. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a client terminal or server or by a processing system of a client terminal or server. Instructions can be, for example, a computer program including code.

A network interface 716 may be any type of interface to a network (e.g., an Internet network interface) and may reside between any of the components shown in FIG. 7. For the example of a client 102, the network interface 716 may be used to send user commands and responses from the device 240 to the server 104/304 over the network 106, and to receive display data (e.g., display data for the virtual desktop) and instructions (e.g., string descriptor requests) from the server 104/304 over the network 106.

A device interface 718 may be any type of interface to a device and may reside between any of the components shown in FIG. 7. A device interface 718 may, for example, be an interface to an external device (e.g., USB device) that plugs into a port (e.g., USB port) of the system 700. For the example of a client 102, the bus driver 230 may be configured to detect the presence of a device 240 connected to the client 102 via the device interface 718, and to read device information (e.g., device descriptor) from the device 240 via the device interface 718 to identify the device 240.

A transceiver block 707 may represent one or more transceivers, and each transceiver may include a receiver 706 and a transmitter 709. A functionality implemented in a processing system 702 may be implemented in a portion of a receiver 706, a portion of a transmitter 709, a portion of a machine-readable medium 710, a portion of a display 712, a portion of a keypad 714, or a portion of an interface 716, and vice versa.

For the example of a client 102, the bus driver 230 may be implemented by the processing system 702, the device interface 718, the machine-readable medium 710 or any combination thereof and the proxy 210 may be implemented by the processing system 702, the network interface 716, the machine-readable medium 710 or any combination thereof. The stub driver 220 may be implemented by the processing system 702, the machine-readable medium 710 or any combination thereof. For example, the machine-readable medium 710 may comprise software programs that may be executed by the processing system 702 to realize various functions of the bus driver 230, stub driver 220 and the proxy 210.

For the example of a server 104/304, the virtual bus driver 260, device stack 280, DARM 180, and application may be implemented by the processing system 702, the machine-readable medium 710 or any combination thereof, and the agent 250 may be implemented by the network interface 716, the processing system 702, the machine-readable medium 710 or any combination thereof.

FIG. 8 is a simplified block diagram of illustrative modules of a server 304 of a local device virtualization system. A server 304 may comprise some or all of the following: a device access restriction module (DARM) 180, an operating system module 826, and hardware components 830. The device access restriction module (DARM) 180 itself may comprise some or all of the following: a hook module 803, an intercept module 805 (also referred to as a redirection module), a device identification module 811, a stack traverse module 813, a device configuration module 815, a local link creation module 817, and a local link deletion module 819. The intercept module 805 may comprise one or both of: a link creation module 807 and a link removal module 809. The operating system module 826 may preferably include a kernel 828. The modules and/or components of the server 304 may be in communication with one another. In some aspects, the hardware components 830 may comprise various interface devices, and the modules of server 304 are further in communication with the various network interface device, transceiver, and network. The modules may thus be in communication with the network 106 and/or one or more clients 102 and devices 240 via a network connection.

In a preferred embodiment, the modules (e.g., 803 through 828) are implemented in hardware using software (e.g., a machine-readable medium comprising subroutines or code). In another embodiment, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the present disclosure are further described in the disclosure.

The various modules 803-828 may perform various functions described in relation to FIGS. 5A, 5B, and 6 above. For example, hook module 803 may perform some or all of operations 501, 551, and 602; intercept module 805 may perform some or all of operations 503, 553, 603, and 613; device identification module 811 may perform some or all of operations 505, 555, 604, and 605; stack traverse module 813 may perform some or all of operations 507 and 607-609; device configuration module 815 may perform some or all of operations 509 and 610-611; local link creation module 817 may perform some or all of operations 511 and 612; and local link deletion module 819 may perform some or all of operations 555-557 and 613. The link creation module 807 may perform some or all of operations 503 and 603, and link removal module 809 may perform some or all of operations 553 and 613. The operating system module 826 may perform some or all of operations 606, or other operations described herein as being performed by operating system 170 or a module thereof.

Illustration of Method/Machine-Readable Storage Medium/Apparatus for Providing Private Session-Based Access to a Redirected Device, Wherein the Device is Connected Locally to a Client, and the Server is Remote to the Client and the Device (Described as Clauses)

Various examples of aspects of the subject technology are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

1. A method (see, e.g., 900-A in FIG. 9A) for restricting access to a device from a server, the method comprising:

facilitating interception, at the server, of a function call to create a symbolic link (see, e.g., 902-A in FIG. 9A);

facilitating determination that the intercepted function call to create the symbolic link corresponds to a device object associated with the device that is remote to the server and is connected locally to a client that is remote to the server (see, e.g., 904-A in FIG. 9A);

facilitating obtaining configuration data indicating whether access to the device is to be restricted (see, e.g., 906-A in FIG. 9A); and facilitating creation of the symbolic link in a local namespace of an object manager namespace of the server, upon obtaining configuration data indicating that access to the device is to be restricted (see, e.g., 908-A in FIG. 9A).

2. The method according to clause 1, wherein the device is a USB device.

3. The method according to clause 1, wherein the facilitating creation of the symbolic link comprises facilitating creation of the symbolic link in a local namespace associated with the client's user session on the server, the client having the device locally connected.

4. The method according to clause 1, wherein the facilitating interception comprises:

facilitating modification of a system service description table (SSDT) of the server to redirect, function calls to create symbolic links, to an intercept module; and facilitating redirection, of a function call to create the symbolic link, to the intercept module.

5. The method according to clause 1, wherein the facilitating determination comprises:

facilitating determination that the intercepted function call to create the symbolic link corresponds to the device object;

facilitating traversal of a device stack associated with the device object to identify a lowest bus driver associated with the device object; and facilitating determination that the device object is associated with the device that is remote to the server and is connected locally to the client that is remote to the server, based on the identification of the bus driver.

6. The method according to clause 1, wherein the facilitating obtaining configuration data comprises:

facilitating retrieving configuration data associated with the device from a storage device of the server.

7. The method according to clause 1, wherein the facilitating obtaining configuration data comprises:

facilitating receiving configuration data associated with the device object from a user session of the client having the device connected locally.

8. The method according to clause 1, further comprising:

facilitating providing secure session-based access to the device using the symbolic link created in the local namespace of the object manager namespace of the server.

9. The method according to clause 1, wherein the facilitating creation of the symbolic link comprises facilitating creation of the symbolic link in a local namespace associated with a first user session, the method further comprising:

facilitating receiving, at the server, a request including the created symbolic link from a second user session;

facilitating determining whether the created symbolic link is in a local namespace associated with the second user session or in a global namespace; and facilitating blocking the received request upon determining that the created symbolic link is not in the local namespace associated with the second user session and not in the global namespace.

10. The method according to clause 1, further comprising:

facilitating interception, at the server, of a function call to delete the symbolic link; and facilitating deletion of the symbolic link from the object manager namespace of the server.

11. The method according to clause 10, wherein the facilitating deletion comprises:

facilitating determining that the function call to delete the symbolic link corresponds to a symbolic link in the local namespace of the object manager namespace of the server; and facilitating deletion of the symbolic link from the local namespace of the object manager namespace of the server.

Examples of Machine-Readable Medium Clauses

Figure 9B:
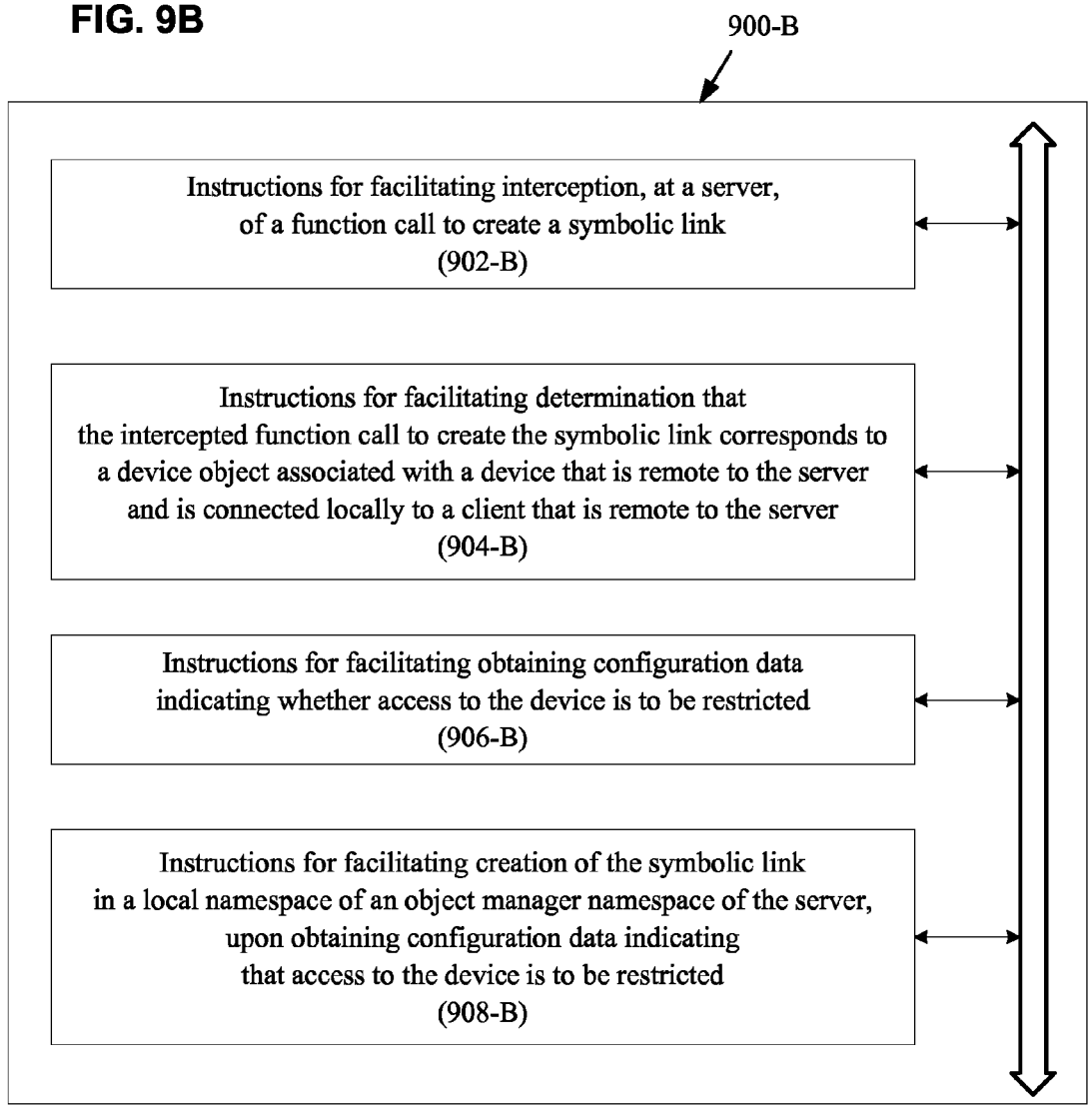
FIG. 9B is a block diagram representing an example of a machine-readable storage medium encoded with instructions executable by a processor to perform a method for restricting access to a device from a server, in accordance with one aspect of the disclosure.

12. A machine-readable storage medium (see, e.g., 900-B in FIG. 9B) encoded with instructions executable by one or more processors to perform one or more operations, the one or more operations comprising:

facilitating interception, at a server, of a function call to create a symbolic link (see, e.g., 902-B in FIG. 9B);

facilitating determination that the intercepted function call to create the symbolic link corresponds to a device object associated with a device that is remote to the server and is connected locally to a client that is remote to the server (see, e.g., 904-B in FIG. 9B);

facilitating obtaining configuration data indicating whether access to the device is to be restricted (see, e.g., 906-B in FIG. 9B); and facilitating creation of the symbolic link in a local namespace of an object manager namespace of the server, upon obtaining configuration data indicating that access to the device is to be restricted (see, e.g., 908-B in FIG. 9B).

13. The machine-readable storage medium according to clause 12, wherein the device is a USB device.

14. The machine-readable storage medium according to clause 12, wherein the facilitating creation of the symbolic link comprises facilitating creation of the symbolic link in a local namespace associated with the client's user session on the server, the client having the device locally connected.

15. The machine-readable storage medium according to clause 12, wherein the facilitating interception comprises:

facilitating modification of a system service description table (SSDT) of the server to redirect, function calls to create symbolic links, to an intercept module; and facilitating redirection, of a function call to create the symbolic link, to the intercept module.

16. The machine-readable storage medium according to clause 12, wherein the facilitating determination comprises:

facilitating determination that the intercepted function call to create the symbolic link corresponds to the device object;

facilitating traversal of a device stack associated with the device object to identify a lowest bus driver associated with the device object; and facilitating determination that the device object is associated with the device that is remote to the server and is connected locally to the client that is remote to the server, based on the identification of the bus driver.

17. The machine-readable storage medium according to clause 12, wherein the facilitating obtaining configuration data comprises:

facilitating retrieving configuration data associated with the device from a storage device of the server.

18. The machine-readable storage medium according to clause 12, wherein the facilitating obtaining configuration data comprises:

facilitating receiving configuration data associated with the device object from a user session of the client having the device connected locally.

19. The machine-readable storage medium according to clause 12, wherein the one or more operations further comprise:

facilitating providing secure session-based access to the device using the symbolic link created in the local namespace of the object manager namespace of the server.

20. The machine-readable storage medium according to clause 12, wherein the facilitating creation of the symbolic link comprises facilitating creation of the symbolic link in a local namespace associated with a first user session, and wherein the one or more operations further comprise:

facilitating receiving, at the server, a request including the created symbolic link from a second user session;

facilitating determining whether the created symbolic link is in a local namespace associated with the second user session or in a global namespace; and facilitating blocking the received request upon determining that the created symbolic link is not in the local namespace associated with the second user session and not in the global namespace.

21. The machine-readable storage medium according to clause 12, wherein the one or more operations further comprise:

facilitating interception, at the server, of a function call to delete the symbolic link; and facilitating deletion of the symbolic link from the object manager namespace of the server.

22. The machine-readable storage medium according to clause 21, wherein the facilitating deletion comprises:

facilitating determining that the function call to delete the symbolic link corresponds to a symbolic link in the local namespace of the object manager namespace of the server; and facilitating deletion of the symbolic link from the local namespace of the object manager namespace of the server.

Examples of Apparatus Clauses

23. A hardware apparatus (see, e.g., 900-C in FIG. 9C), comprising:

one or more modules configured to perform one or more operations comprising:

facilitating interception, at a server, of a function call to create a symbolic link (see, e.g., 902-C in FIG. 9C);

facilitating determination that the intercepted function call to create the symbolic link corresponds to a device object associated with a device that is remote to the server and is connected locally to a client that is remote to the server (see, e.g., 904-C in FIG. 9C);

facilitating obtaining configuration data indicating whether access to the device is to be restricted (see, e.g., 906-C in FIG. 9C); and facilitating creation of the symbolic link in a local namespace of an object manager namespace of the server, upon obtaining configuration data indicating that access to the device is to be restricted (see, e.g., 908-C in FIG. 9C).

24. The hardware apparatus according to clause 23, wherein the device is a USB device.

25. The hardware apparatus according to clause 23, wherein the facilitating creation of the symbolic link comprises facilitating creation of the symbolic link in a local namespace associated with the client's user session on the server, the client having the device locally connected.

26. The hardware apparatus according to clause 23, wherein the facilitating interception comprises:

facilitating modification of a system service description table (SSDT) of the server to redirect, function calls to create symbolic links, to an intercept module; and facilitating redirection, of a function call to create the symbolic link, to the intercept module.

27. The hardware apparatus according to clause 23, wherein the facilitating determination comprises:

facilitating determination that the intercepted function call to create the symbolic link corresponds to the device object;

facilitating traversal of a device stack associated with the device object to identify a lowest bus driver associated with the device object; and facilitating determination that the device object is associated with the device that is remote to the server and is connected locally to the client that is remote to the server, based on the identification of the bus driver.

28. The hardware apparatus according to clause 23, wherein the facilitating obtaining configuration data comprises:

facilitating retrieving configuration data associated with the device from a storage device of the server.

29. The hardware apparatus according to clause 23, wherein the facilitating obtaining configuration data comprises:

facilitating receiving configuration data associated with the device object from a user session of the client having the device connected locally.

30. The hardware apparatus according to clause 23, wherein the one or more operations further comprise:

facilitating providing secure session-based access to the device using the symbolic link created in the local namespace of the object manager namespace of the server.

31. The hardware apparatus according to clause 23, wherein the facilitating creation of the symbolic link comprises facilitating creation of the symbolic link in a local namespace associated with a first user session, and wherein the one or more operations further comprise:

facilitating receiving, at the server, a request including the created symbolic link from a second user session;

facilitating determining whether the created symbolic link is in a local namespace associated with the second user session or in a global namespace; and facilitating blocking the received request upon determining that the created symbolic link is not in the local namespace associated with the second user session and not in the global namespace.

32. The hardware apparatus according to clause 23, wherein the one or more operations further comprise:

facilitating interception, at the server, of a function call to delete the symbolic link; and facilitating deletion of the symbolic link from the object manager namespace of the server.

33. The hardware apparatus according to clause 32, wherein the facilitating deletion comprises:

facilitating determining that the function call to delete the symbolic link corresponds to a symbolic link in the local namespace of the object manager namespace of the server; and facilitating deletion of the symbolic link from the local namespace of the object manager namespace of the server.

Examples of Apparatus Clauses

34. An apparatus (see, e.g., 900-C in FIG. 9C), comprising:

means for facilitating interception, at a server, of a function call to create a symbolic link (see, e.g., 902-C in FIG. 9C);

means for facilitating determination that the intercepted function call to create the symbolic link corresponds to a device object associated with a device that is remote to the server and is connected locally to a client that is remote to the server (see, e.g., 904-C in FIG. 9C);

means for facilitating obtaining configuration data indicating whether access to the device is to be restricted (see, e.g., 906-C in FIG. 9C); and means for facilitating creation of the symbolic link in a local namespace of an object manager namespace of the server, upon obtaining configuration data indicating that access to the device is to be restricted (see, e.g., 908-C in FIG. 9C).

35. The apparatus according to clause 34, wherein the device is a USB device.

36. The apparatus according to clause 34, wherein the means for facilitating creation of the symbolic link comprises means for facilitating creation of the symbolic link in a local namespace associated with the client's user session on the server, the client having the device locally connected.

37. The apparatus according to clause 34, wherein the means for facilitating interception comprises:

means for facilitating modification of a system service description table (SSDT) of the server to redirect, function calls to create symbolic links, to an intercept module; and means for facilitating redirection, of a function call to create the symbolic link, to the intercept module.

38. The apparatus according to clause 34, wherein the means for facilitating determination comprises:

means for facilitating determination that the intercepted function call to create the symbolic link corresponds to the device object;

means for facilitating traversal of a device stack associated with the device object to identify a lowest bus driver associated with the device object; and means for facilitating determination that the device object is associated with the device that is remote to the server and is connected locally to the client that is remote to the server, based on the identification of the bus driver.

39. The apparatus according to clause 34, wherein the means for facilitating obtaining configuration data comprises:

means for facilitating retrieving configuration data associated with the device from a storage device of the server.

40. The apparatus according to clause 34, wherein the means for facilitating obtaining configuration data comprises:

means for facilitating receiving configuration data associated with the device object from a user session of the client having the device connected locally.

41. The apparatus according to clause 34, further comprising:

means for facilitating providing secure session-based access to the device using the symbolic link created in the local namespace of the object manager namespace of the server.

42. The apparatus according to clause 34, wherein the means for facilitating creation of the symbolic link comprises means for facilitating creation of the symbolic link in a local namespace associated with a first user session, the apparatus further comprising:

means for facilitating receiving, at the server, a request including the created symbolic link from a second user session;

means for facilitating determining whether the created symbolic link is in a local namespace associated with the second user session or in a global namespace; and means for facilitating blocking the received request upon determining that the created symbolic link is not in the local namespace associated with the second user session and not in the global namespace.

43. The apparatus according to clause 34, further comprising:

means for facilitating interception, at the server, of a function call to delete the symbolic link; and means for facilitating deletion of the symbolic link from the object manager namespace of the server.

44. The apparatus according to clause 43, wherein the means for facilitating deletion comprises:

means for facilitating determining that the function call to delete the symbolic link corresponds to a symbolic link in the local namespace of the object manager namespace of the server; and means for facilitating deletion of the symbolic link from the local namespace of the object manager namespace of the server.

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means—for elements (e.g., means for performing an action) such that each means—for element can be represented as a module for element (e.g., a module for performing an action).

Those of skill in the art would appreciate that items such as the various illustrative blocks, modules, elements, components, methods, operations, steps, and algorithms described herein (e.g., client 102, server 104/304, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.). Those skilled in the art will recognize how to implement the instructions, circuits, and processing systems.

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect of the disclosure, when actions or functions are described as being performed by an item (e.g., hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function), it is understood that such actions or functions may be performed by the item directly or indirectly. In one aspect, when a module is described as performing an action, the module may be understood to perform the action directly. In one aspect, when a module is described as performing an action, the module may be understood to perform the action indirectly, for example, by facilitating, enabling or causing such an action.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules. For example, a local link creation module and a local link deletion module may be combined into one module. A hook module and an intercept module may be combined into one module. A device identification module and a stack traverse module may be combined into one module. In another example, these modules may be divided into a larger number of modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A method for restricting access to a device from a server, the method comprising:

intercepting, at the server, a function call to create a symbolic link;
determining that the intercepted function call corresponds to a device object associated with the device that is remote to the server and is connected locally to a client that is remote to the server;
obtaining configuration data indicating whether access to the device is to be restricted; and
creating the symbolic link in a local namespace of an object manager namespace of the server, upon obtaining configuration data indicating that access to the device is to be restricted.

2. The method according to claim 1, wherein the device is a USB device.

3. The method according to claim 1, wherein creating the symbolic link comprises creating the symbolic link in a local namespace associated with the client's user session on the server, the client having the device locally connected.

4. The method according to claim 1, wherein intercepting the functional call comprises:
modifying a system service description table (SSDT) of the server to redirect function calls to create symbolic links to an intercept module; and
redirecting the function call to create the symbolic link to the intercept module.

5. The method according to claim 1, wherein determining that the intercepted function call corresponds to a device object associated with the device that is remote to the server comprises:
traversing a device stack associated with the device object to identify a lowest bus driver associated with the device object; and
determining that the device object is associated with the device that is remote to the server and is connected locally to the client that is remote to the server, based on the identification of the bus driver.

6. The method according to claim 1, wherein obtaining configuration data comprises:
retrieving configuration data associated with the device from a storage device of the server.

7. The method according to claim 1, wherein obtaining configuration data comprises:
receiving configuration data associated with the device object from a user session of the client having the device connected locally.

8. The method according to claim 1, further comprising:
providing secure session-based access to the device using the symbolic link created in the local namespace of the object manager namespace of the server.

9. The method according to claim 1, further comprising:
creating the symbolic link in a local namespace associated with a first user session;
receiving, at the server, a request including the created symbolic link from a second user session;
determining whether the created symbolic link is in a local namespace associated with the second user session or in a global namespace; and
blocking the received request upon determining that the created symbolic link is not in the local namespace associated with the second user session and not in the global namespace.

10. The method according to claim 1, further comprising:
intercepting, at the server, a function call to delete the symbolic link; and
deleting the symbolic link from the object manager namespace of the server.

11. The method according to claim 10, wherein deleting the symbolic link comprises:
determining that the function call to delete the symbolic link corresponds to a symbolic link in the local namespace of the object manager namespace of the server; and
deleting the symbolic link from the local namespace of the object manager namespace of the server.

12. A non-transitory machine-readable storage medium encoded with instructions executable by one or more processors to perform one or more operations, the one or more operations comprising:
intercepting, at a server, a function call to create a symbolic link;
determining that the intercepted function call corresponds to a device object associated with a device that is remote to the server and is connected locally to a client that is remote to the server;
obtaining configuration data indicating whether access to the device is to be restricted; and
creating the symbolic link in a local namespace of an object manager namespace of the server, upon obtaining configuration data indicating that access to the device is to be restricted.

13. The machine-readable storage medium according to claim 12, wherein the device is a USB device.

14. The machine-readable storage medium according to claim 12, wherein creating the symbolic link comprises creating the symbolic link in a local namespace associated with the client's user session on the server, the client having the device locally connected.

15. The machine-readable storage medium according to claim 12, wherein intercepting the function call comprises:
modifying a system service description table (SSDT) of the server to redirect function calls to create symbolic links to an intercept module; and
redirecting the function call to create the symbolic link to the intercept module.

16. The machine-readable storage medium according to claim 12, wherein determining that the intercepted function call corresponds to a device object associated with a device that is remote to the server comprises:
traversing a device stack associated with the device object to identify a lowest bus driver associated with the device object; and
determining that the device object is associated with the device that is remote to the server and is connected locally to the client that is remote to the server, based on the identification of the bus driver.

17. The machine-readable storage medium according to claim 12, wherein obtaining configuration data comprises:
retrieving configuration data associated with the device from a storage device of the server.

18. The machine-readable storage medium according to claim 12, wherein obtaining configuration data comprises:
receiving configuration data associated with the device object from a user session of the client having the device connected locally.

19. The machine-readable storage medium according to claim 12, wherein the one or more operations further comprise:
providing secure session-based access to the device using the symbolic link created in the local namespace of the object manager namespace of the server.

20. The machine-readable storage medium according to claim 12, wherein the one or more operations further comprise:

creating the symbolic link in a local namespace associated with a first user session;
receiving, at the server, a request including the created symbolic link from a second user session;
determining whether the created symbolic link is in a local namespace associated with the second user session or in a global namespace; and
blocking the received request upon determining that the created symbolic link is not in the local namespace associated with the second user session and not in the global namespace.

21. The machine-readable storage medium according to claim 12, wherein the one or more operations further comprise:
intercepting, at the server, a function call to delete the symbolic link; and
deleting the symbolic link from the object manager namespace of the server.

22. The machine-readable storage medium according to claim 21, wherein deleting the symbolic link from the object manager namespace of the server comprises:
determining that the function call to delete the symbolic link corresponds to a symbolic link in the local namespace of the object manager namespace of the server; and
deleting the symbolic link from the local namespace of the object manager namespace of the server.

23. A hardware apparatus, comprising:
a processor; and
a memory encoded with instructions executable by the processor to perform one or more operations comprising:
intercepting, at a server, a function call to create a symbolic link;
determining that the intercepted function call to create the symbolic link corresponds to a device object associated with a device that is remote to the server and is connected locally to a client that is remote to the server;
obtaining configuration data indicating whether access to the device is to be restricted; and
creating the symbolic link in a local namespace of an object manager namespace of the server, upon obtaining configuration data indicating that access to the device is to be restricted.

24. The hardware apparatus according to claim 23, wherein the device is a USB device.

25. The hardware apparatus according to claim 23, wherein creating the symbolic link comprises creating the symbolic link in a local namespace associated with the client's user session on the server, the client having the device locally connected.

26. The hardware apparatus according to claim 23, wherein intercepting the function call comprises:
modifying a system service description table (SSDT) of the server to redirect, function calls to create symbolic links, to an intercept module; and
redirecting a function call to create the symbolic link to the intercept module.

27. The hardware apparatus according to claim 23, wherein determining that the intercepted function call to create the symbolic link corresponds to a device object associated with a device that is remote to the server comprises:
traversing a device stack associated with the device object to identify a lowest bus driver associated with the device object; and
determining that the device object is associated with the device that is remote to the server and is connected locally to the client that is remote to the server, based on the identification of the bus driver.

28. The hardware apparatus according to claim 23, wherein the obtaining configuration data comprises:
retrieving configuration data associated with the device from a storage device of the server.

29. The hardware apparatus according to claim 23, wherein the obtaining configuration data comprises:
receiving configuration data associated with the device object from a user session of the client having the device connected locally.

30. The hardware apparatus according to claim 23, wherein the one or more operations further comprise:
providing secure session-based access to the device using the symbolic link created in the local namespace of the object manager namespace of the server.

31. The hardware apparatus according to claim 23, wherein the one or more operations further comprise:
creating the symbolic link in a local namespace associated with a first user session;
receiving, at the server, a request including the created symbolic link from a second user session;
determining whether the created symbolic link is in a local namespace associated with the second user session or in a global namespace; and
blocking the received request upon determining that the created symbolic link is not in the local namespace associated with the second user session and not in the global namespace.

32. The hardware apparatus according to claim 23, wherein the one or more operations further comprise:
intercepting, at the server, a function call to delete the symbolic link; and
deleting the symbolic link from the object manager namespace of the server.

33. The hardware apparatus according to claim 32, wherein deleting the symbolic link from the object manager name space of the server comprises:
determining that the function call to delete the symbolic link corresponds to a symbolic link in the local namespace of the object manager namespace of the server; and
deleting the symbolic link from the local namespace of the object manager namespace of the server.

* * * * *